(12) United States Patent
Higdon et al.

(10) Patent No.: US 12,310,354 B1
(45) Date of Patent: May 27, 2025

(54) PORTABLE HUNTING BLIND

(71) Applicant: Higdon Outdoors, LLC, Paducah, KY (US)

(72) Inventors: Ben Higdon, Paducah, KY (US); Brook Richard, Paducah, KY (US); Jesse Eisenmann, Paducah, KY (US); James Gianladis, Paducah, KY (US); Adam Birk, Paducah, KY (US)

(73) Assignee: HIGDON OUTDOORS, LLC, Paducah, KY (US)

( * ) Notice: Subject to any disclaimer, the term of this patent is extended or adjusted under 35 U.S.C. 154(b) by 743 days.

(21) Appl. No.: 17/583,837

(22) Filed: Jan. 25, 2022

Related U.S. Application Data

(60) Provisional application No. 63/140,993, filed on Jan. 25, 2021.

(51) Int. Cl.
*A01M 31/02* (2006.01)
*E04H 15/00* (2006.01)

(52) U.S. Cl.
CPC ......... *A01M 31/025* (2013.01); *E04H 15/001* (2013.01); *E04H 15/005* (2013.01); *Y10S 135/901* (2013.01)

(58) Field of Classification Search
CPC . E04H 15/001; A01M 31/025; Y10S 135/901
See application file for complete search history.

(56) References Cited

U.S. PATENT DOCUMENTS

| | | | | |
|---|---|---|---|---|
| 3,018,857 A * | 1/1962 | Parham | ................ | E04H 15/001 52/36.2 |
| 3,169,543 A * | 2/1965 | Mcgerty | ................ | E04H 15/48 135/117 |
| 3,428,108 A * | 2/1969 | Singer | ................ | E04B 2/7431 40/605 |
| 3,709,237 A * | 1/1973 | Smith | ................ | E04H 1/1244 256/25 |
| 3,913,598 A * | 10/1975 | Glutting, Jr. | ............ | E04H 15/48 D25/16 |
| 4,554,937 A * | 11/1985 | Irwin | .................... | E04H 15/001 135/100 |
| 4,632,138 A * | 12/1986 | Irwin | .................... | E04H 15/001 135/901 |
| 4,773,437 A * | 9/1988 | Glutting | ................ | E04H 15/001 135/117 |
| 4,926,892 A * | 5/1990 | Osmonson | .......... | E04G 21/3233 135/900 |

(Continued)

*Primary Examiner* — David R Dunn
*Assistant Examiner* — Danielle Jackson
(74) *Attorney, Agent, or Firm* — C. Brandon Browning; Maynard Nexsen PC

(57) ABSTRACT

The present disclosure is directed to a hunting blind with a plurality of planar panels, where the panels are arranged side-by-side and coupled together along their lateral edges to one another using selectively lockable hinges to form an elongate, essentially U or C shaped structure. The hunting blind is arranged to partially surround and define a three-dimensional space in which a hunter may be concealed from game. Support members that extend into the three-dimensional space are excluded in the disclosed hunting blind, such that the volume of usable space concealed by the blind is maximized and the hunter's position or movement within the space remains unimpeded.

24 Claims, 32 Drawing Sheets

(56) References Cited

U.S. PATENT DOCUMENTS

| | | | | |
|---|---|---|---|---|
| 5,058,863 A * | 10/1991 | Maffet | F16B 5/0685 | |
| | | | 256/26 | |
| 5,172,525 A * | 12/1992 | Cook | E04H 15/001 | |
| | | | 135/901 | |
| 5,352,149 A * | 10/1994 | Melashenko | A47G 5/00 | |
| | | | 446/490 | |
| 5,373,863 A * | 12/1994 | Prizio | E04H 15/001 | |
| | | | 135/117 | |
| 5,379,786 A * | 1/1995 | Lynam | E04H 15/003 | |
| | | | 160/135 | |
| 5,382,111 A * | 1/1995 | Melashenko | E04H 15/003 | |
| | | | 256/26 | |
| 5,414,950 A * | 5/1995 | Johnson, Sr. | E04H 15/001 | |
| | | | 135/901 | |
| 5,553,648 A * | 9/1996 | Goharjou | E01F 7/00 | |
| | | | 160/237 | |
| 5,592,961 A * | 1/1997 | Chin | E04H 1/1244 | |
| | | | 135/117 | |
| 5,722,477 A * | 3/1998 | Richter | F16B 7/04 | |
| | | | 403/231 | |
| 5,881,789 A * | 3/1999 | Melashenko | A47G 5/00 | |
| | | | 403/217 | |
| 5,993,287 A * | 11/1999 | Melashenko | E04H 15/006 | |
| | | | 446/478 | |
| 6,164,005 A * | 12/2000 | Copeland | A01M 31/025 | |
| | | | 135/901 | |
| 6,408,865 B1 * | 6/2002 | Bliss | A01M 31/025 | |
| | | | 135/132 | |
| 6,532,701 B2 * | 3/2003 | Williams | A01K 1/0041 | |
| | | | 52/646 | |
| 7,231,954 B2 * | 6/2007 | Green | E01F 13/022 | |
| | | | 52/63 | |
| 7,743,781 B2 * | 6/2010 | Slaughter | E04H 15/001 | |
| | | | 135/117 | |
| 9,316,017 B1 * | 4/2016 | Slaughter | E04H 15/001 | |
| 9,447,602 B1 * | 9/2016 | Arias | E04H 15/003 | |
| 10,077,573 B1 * | 9/2018 | Slaughter | E04H 15/001 | |
| 10,584,511 B1 * | 3/2020 | Slaughter | E04H 15/001 | |
| 2002/0124975 A1 * | 9/2002 | Kendrick | A01M 31/025 | |
| | | | 160/351 | |
| 2007/0251561 A1 * | 11/2007 | Lee | E04H 15/001 | |
| | | | 135/114 | |
| 2014/0251402 A1 * | 9/2014 | Koch | E04H 15/48 | |
| | | | 52/79.5 | |

* cited by examiner

PORTABLE HUNTING BLIND

RELATED APPLICATIONS

This application claims priority to U.S. Provisional Patent Application No. 63/140,993 filed on Jan. 25, 2021, titled "Portable Hunting Blind", the entire contents of which are incorporated herein.

TECHNICAL FIELD

The present invention is directed to a portable hunting blind and, more particularly, a hunting blind including a plurality of planar panels coupled together and arranged to partially surround and define a three-dimensional space in which a hunter may be concealed from game.

BACKGROUND OF INVENTION

Portable hunting blinds are known in the art. For example, U.S. Pat. No. 6,164,005 to Copeland is directed to a hunting blind including a first frame having two vertical side rails, a horizontal top and bottom rails transversely mounted to the vertical side rails forming a front and back side of the first frame, a first pair of vertical legs attached to the rails and extending below the side rails for ground insertion, a first sleeve having four sides with each side having a different camouflage pattern, and a seam formed in the first sleeve formed by sewing such that two sides are located on an inside of the first sleeve and two sides are located on an outside of the first sleeve. The first sleeve has a width slightly greater that a width of the first frame, and the first sleeve is mounted over the first frame and two camouflage patterns so that it can be seen, one pattern on the front side and another pattern on the back side whereby the first sleeve can be removed from the first frame and the first sleeve can be turned inside out and mounted on the first frame such that two different camouflage patterns can be seen.

U.S. Pat. No. 5,592,960 to Williams discloses a hunting blind constructed of a set of reflectively mirrored wall panels with a camouflaged top cover, to form a rectangular structure which reflects the surrounding environment to conceal the structure of the blind. The wall panels are each formed of a rigid sheet of reinforced closed cell foam material, with a sheet of mirrored clear plastic material bonded to one surface of the foam sheet. The mirrored surface of the plastic sheet is secured directly to the foam sheet, thereby sandwiching the mirrored surface between the overlying clear plastic material and the foam panel to protect the mirrored surface from damage. The wall panels are rigidly but removably connected together with corner channel members to form a rigid, inflexible structure. A top closure or roof is formed of a flexible camouflage sheet, or alternatively of rigid foam sheet having a camouflage pattern thereon. Other features include internal anchor flaps, viewing ports and openable top hatches, a lower door for a hunting dog, and storage and shelf areas. The entire structure is transportable by disassembling the panels at the corner channel connecting members and removing the top cover, passing some hanging straps through the open view ports, and passing a pole through the straps to carry the disassembled structure using the central pole.

U.S. Pat. No. 10,711,482 to Ivy discloses a portable hunting blind including semi-rigid side material having a height and a length, the side material adapted to be supported in an upright orientation upon a surface underneath by a plurality of rod supports, and the side material sized and adapted to be positionable to form a closed shape upon the surface. The closed shape conceals a hunter within an interior space surrounded by the side material. A top edge of the side material is formed to include troughs of varying depth and shape to provide an improved camouflage characteristic for the top edge of the side material, the troughs being adapted to provide support for resting the barrel of a gun. A plurality of anchor receptacles through which tent stakes may be used are provided to secure a bottom edge of the side material.

U.S. Pat. No. 9,316,017 to Slaughter discloses a portable reconfigurable hunting blind assembly including eight generally rectangular frames joined together side edge to side edge by seven hinges for accordion folding, and a camouflage covering mounted to each of the frames to define eight panel-shaped wall units, the camouflage covering defining a window in at least some of the wall units, wherein the frames are identified as a first frame on a first end of the hunting blind assembly, a second frame adjacent to the first frame, a third frame adjacent to the second frame, a fourth frame adjacent to the third frame, a fifth frame adjacent to the fourth frame, and a sixth frame adjacent to the fifth frame, a seventh frame adjacent to the sixth frame, and an eighth frame adjacent to the seventh frame. The eighth frame forms a second end of the hunting blind assembly, wherein the frames are attached by hinges which define hinge lines, and the hinges are identified as a first hinge between the first and second panels, a second hinge between the second and third panels, a third hinge between the third and fourth panels, a fourth hinge between the fourth and fifth panels, a fifth hinge between the fifth and sixth panels, a sixth hinge between the sixth and seventh panels, and a seventh hinge between the seventh and eighth panels, wherein the first hinge permits the first frame and the second frame to swing over an angle of about 270 degrees with respect to each other and the third hinge permits the third and fourth frames to swing over an angle of about 270 degrees with respect to each other and the fifth hinge permits the fifth and sixth frames to swing over an angle of about 270 degrees with respect to each other and the seventh hinge permits the seventh and eighth frames to swing over an angle of about 270 degrees with respect to each other The portable reconfigurable hunting blind assembly further includes a latch element to extend between the fourth and fifth frames when deployed and restrain the fourth and fifth frames against bowing out when the blind assembly is in a closed square configuration.

U.S. Pat. No. 9,066,512 to Nolz discloses a hunting blind including first and second support poles, each being tubular with a lumen, a first connector attached to the first and second support poles in a manner that enables the first and second support poles to pivot with respect to each other, a first rod slideably received within the lumen of the first support pole and having a first distal end projecting from the first support pole, a second rod slideably received within the lumen of the second support pole and having a second distal end projecting from the second support pole, a sheet defining a first sleeve arranged to receive and substantially conceal the first rod, and a second sleeve arranged to receive and substantially conceal the second rod. A first sheet connector is provided for holding the sheet against the first support pole, a second sheet connector is provided for holding the sheet against the second support pole, a third sheet connector is provided for holding the sheet against the first rod, and a fourth sheet connector is provided for holding the sheet against the second rod. The third sheet connector includes a first end cap securing the sheet to an end of the first rod, and the fourth sheet connector includes a second end cap securing the sheet to an end of the second rod.

SUMMARY OF THE INVENTION

The present invention is directed to a hunting blind composed of a plurality of panels. In use, the panels are arranged side-by-side, upright to a surface upon which the panels are supported, and positioned relative to one another to form an essentially U or C shaped structure. The panels are locked in place using selectively lockable hinges which extend to and between adjacent panels. The U or C shaped structure partially surrounds and defines a three-dimensional space in which a hunter may be concealed from game. The blind is configured to maximize the volume of useable space in which the hunter may be concealed, in part, by excluding support members and the like extending into the space, for example, from a top portion of a panel to the surface. Such support members can impede a hunter's movement within the space and occupy space that could otherwise be used to store gear or receive the hunter. The space may be further maximized by elevating the panels using telescoping legs, while orienting the panels at angles relative to the surface that meet the hunter's particular needs. For example, the panels forming the front of the blind may be arranged at an angle relative to the surface on which they are supported in the range of 45° to 90°, 50° to 85°, 55° to 80°, or 60° to 75°. In certain instances, all of the panels may be arranged at angle of about 90° to the surface.

According to one aspect of the invention, the hunting blind includes a plurality of panels including, a frame, opposing end panels including a first panel and a second panel, a middle panel, spacer panels including a third panel and a fourth panel, and a plurality of locking hinges including a first pair of locking hinges coupled to and between the middle panel and the third panel, a second pair of locking hinges coupled to and between the middle panel and the fourth panel, a third pair of locking hinges coupled to and between the first panel and the third panel and a fourth pair of locking hinges coupled to and between the second panel and the fourth panel. The first pair of locking hinges are configured for selectively preventing movement of the middle panel relative to the third panel, the second pair of locking hinges are configured for selectively preventing movement of the middle panel relative to the fourth panel, the third pair of locking hinges are configured for selectively preventing movement of the first panel relative to the third panel, and the fourth pair of locking hinges are configured for selectively preventing movement of the second panel relative to the fourth panel.

In one embodiment of the invention, each of the first panel and the second panel includes an end panel frame having an upper horizontal member, a lower horizontal member having a length that is greater than a length of the upper horizontal member, a first vertical member extending to and between an end of the upper horizontal member and an end of the lower horizontal member, a second vertical member extending to and between another end of the upper horizontal member and another end of the lower horizontal member, a telescoping first leg arranged to selectively extend downward from the first vertical member and a telescoping second leg arranged to selectively extend downward from the second vertical member.

In another embodiment of the invention, each of the third panel and the fourth panel includes a rectangular spacer panel frame having an upper horizontal member, a lower horizontal member, a first vertical member extending to and between an end of the upper horizontal member and an end of the lower horizontal member, and a second vertical member extending to and between another end of the upper horizontal member and another end of the lower horizontal member, the rectangular spacer panel frame excluding telescoping legs and support members configured for extending to and between the rectangular spacer panel frame and a surface on which the blind is supported.

In another embodiment of the invention, the middle panel includes a rectangular middle panel frame defining a plane and having an upper horizontal member, a lower horizontal member, a first vertical member extending to and between an end of the upper horizontal member and an end of the lower horizontal member, a second vertical member extending to and between another end of the upper horizontal member and another end of the lower horizontal member, a pair of telescoping legs configured for selectively extending downwardly therefrom along the plane for supporting the blind on a surface, the middle panel frame excluding a support member configured for extending from the middle panel at an angle to the plane and to a surface on which the blind is supported.

In another embodiment of the invention, each locking hinge of the plurality of locking hinges includes a pair of panel frame member receiving pathways defined by a pair of opposing plates, a bushing disposed in each of the frame member receiving pathways and a cam lock bolt operatively coupled to the pair of opposing plates and configured for selectively compressing each of the bushings between the pair of opposing plates, wherein each bushing includes a split in a sidewall thereof.

In another embodiment of the invention, each locking hinge is disposed between a pair of panel frame protrusions.

In another embodiment of the invention, each panel of the plurality of panels includes a fabric covering having a mesh upper section through which a hunter can see and an opaque section therebelow having an exterior arranged to face an animal being hunted, the exterior surface including a camouflage pattern.

In another embodiment of the invention, the opaque section includes a sleeve portion formed at each opposing lateral edge thereof for coupling the fabric covering to the frame.

In another embodiment of the invention, the opaque section includes at least one connector configured for detachably coupling the fabric covering to an adjacent fabric covering.

In another embodiment of the invention, the blind includes a raised configuration when the telescoping legs of the middle panel and the end panels are extended and a lowered configuration when the telescoping legs of the middle panel and the end panels are retracted.

In another embodiment of the invention, when in the lowered configuration, a lower section the fabric covering is rolled or folded upward and secured in a rolled or folded upward arrangement.

In another embodiment of the invention, when the blind is changed from the lowered configuration to the raised configuration, the fabric covering is converted to an unrolled or unfolded arrangement.

In another embodiment of the invention, when in use, the middle panel and the spacer panels extend along a common plane.

In another embodiment of the invention, when in use, each panel of the middle panel and the spacer panels forms a plane that is arranged at an angle with the surface upon with the blind is supported in the range of 45° to 90°, 50° to 85°, 55° to 80°, or 60° to 75°.

In another embodiment of the invention, the first vertical member of the first panel is arranged adjacent to and essentially parallel to the first vertical member of the third panel and the first vertical member of the second panel is arranged adjacent to and essentially parallel to the first vertical member of the fourth panel.

In another embodiment of the invention, when in use, each of the second vertical member of the first panel and the second vertical member of the second panel extends at angle of about 45 degrees from a surface upon which the blind is supported.

Other devices, methods, features, and advantages will be or become apparent to one with skill in the art upon examination of the following drawings and detailed description. It is intended that all such additional devices, methods, features, and advantages be included within this description, be within the scope of the present disclosure, and be protected by the accompanying claims and drawings.

BRIEF DESCRIPTION OF DRAWINGS

The present disclosure same can be better understood, by way of example only, with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION OF THE INVENTION

Figure 1:
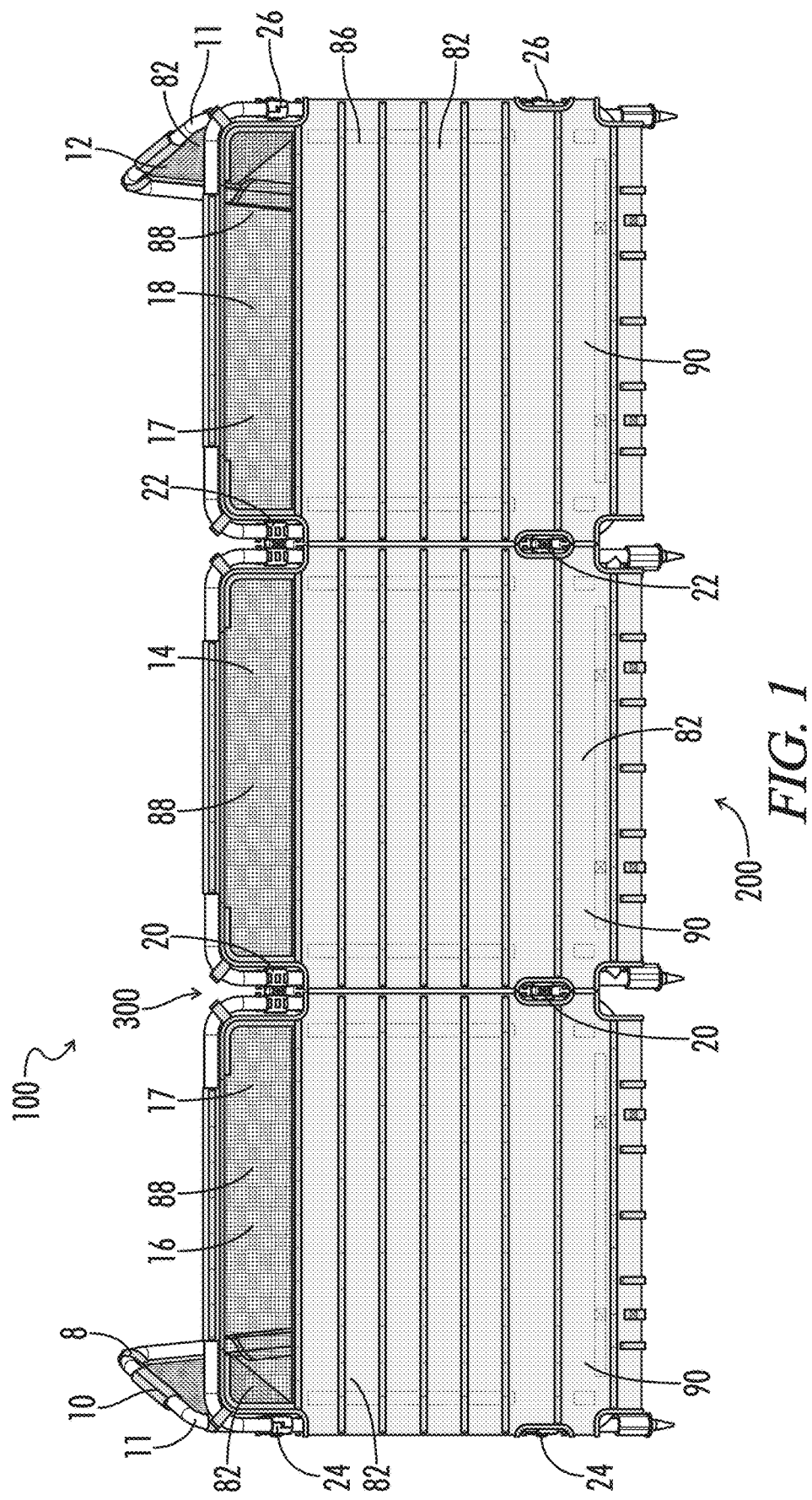
FIG. 1 is a front perspective view of a hunting blind composed of a plurality of panels in accordance with the present invention, the blind being shown in a lowered configuration.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "first," "second," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

As illustrated at FIGS. 1 through 34, the present invention is generally directed to a collapsible, portable hunting blind 100 composed of a plurality of panels constructed of frames 8 with fabric coverings 82 spanning the frames 8. Frames 8 may be constructed of metal or plastic tubing having a round or rectangular cross-section. Metal tubing may be fabricated from aluminum, steel, metal alloy or other metals known in the art for the manufacture of tubing. Fabric coverings 8 may be constructed of any material known in the art having sufficient strength to span across frame members and withstand wind gusts, rain, snow and temperatures ranging between about −20° F. and 110° F. Suitable materials may include engineered vinyl fabric, nylon fabric, polyester fabric, polyester and nylon composite, rip stop nylon, cotton fabric, cotton canvas, or combinations thereof. Fabric coverings 8 include sections of varying transparency, as described in greater detail below. Sections of fabric coverings 8 are constructed of the same material in some instances, while in other instances are constructed using different materials.

When in use, the panels are arranged side-by-side, upright on a surface 200. Examples of surface 200 include, but are not limited to outdoor surfaces such as grass, gravel, stone, soil, sand, or any other material upon which a hunter may be positioned. Surface 200 is a manufactured surface, such as concrete, wood paneling or other flooring in some instances. The panels are positioned relative to one another to form an essentially U or C shaped structure. The panels are locked in place using selectively lockable hinges 19 which extend to and between adjacent panels. The surfaces of fabric coverings 8 displayed on the convex side of the U or C shaped structure and exterior surfaces 86 of the panels depict a camouflage pattern for concealing hunting blind 100 from game, such as waterfowl, deer, predators like coyotes and feral hogs. However, other patterns or designs are compatible with the present disclosure. The concave side of the U or C shaped structure partially surrounds and defines a three-dimensional space 300 in which a hunter and the hunter's gear may be concealed from such game.

Blind 100 is configured to maximize the volume of useable, unobstructed space within space 300, in part, by excluding support members and the like, which are found in prior art collapsible, portable hunting blinds. Such support members typically extend into the space intended for concealing hunters thereby obstructing the hunter's movement and effectively decreasing the amount of usable space for concealing the hunter. The effectiveness of space 300 formed by blind 100 may be further maximized by raising the panels and orienting the panels at angles relative to surface 200 which configure space 300 in a manner that meets the hunter's current needs. These benefits of blind 100 are made possible by the presence of the selectively lockable hinges 19 extending between adjacent panels and, in certain instances, their combination with panel telescoping legs.

Figure 2:
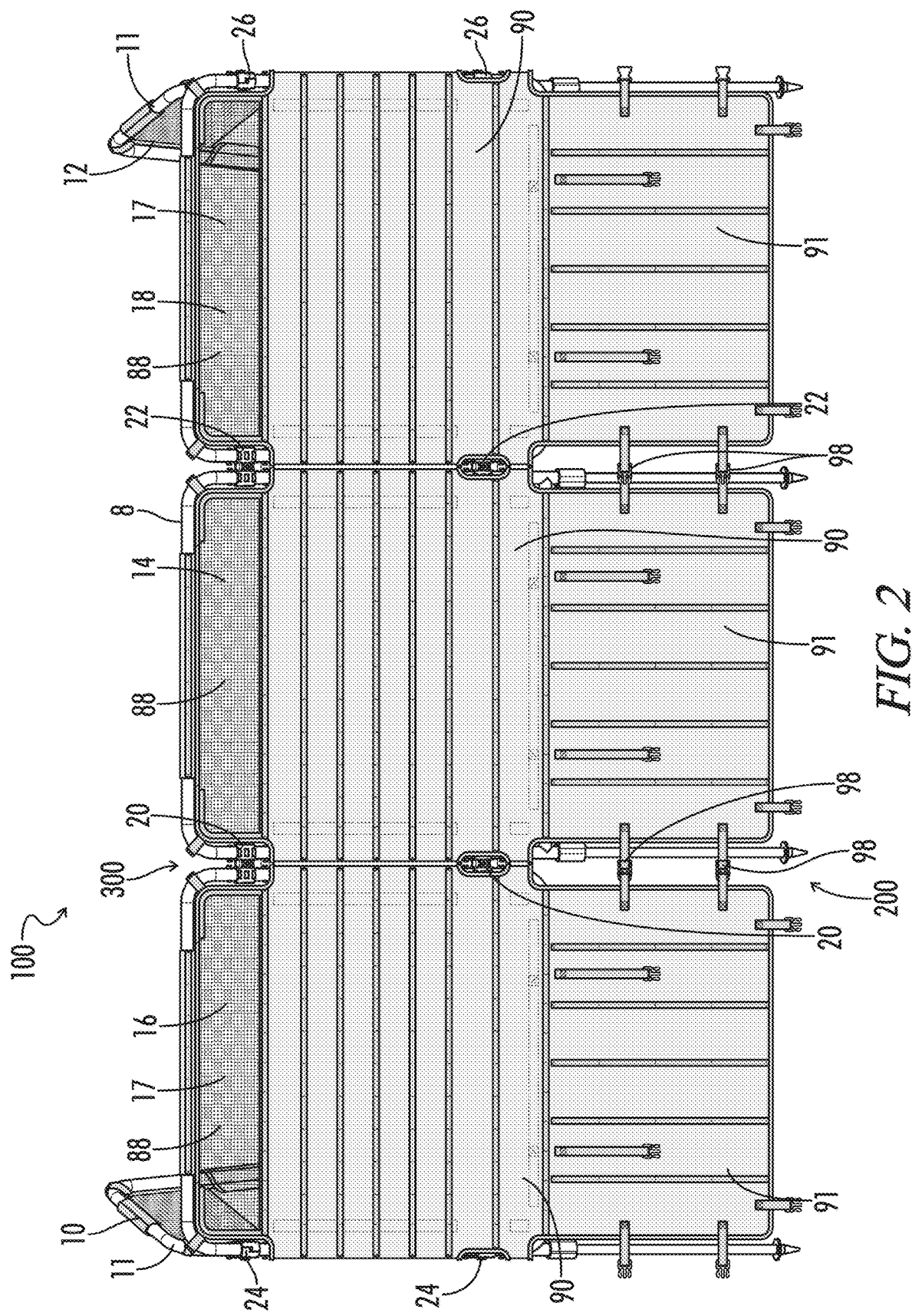
FIG. 2 is a front perspective view of the blind of FIG. 1 in a raised configuration showing fabric panel coverings on the plurality of panels fully extended.
Figure 3:
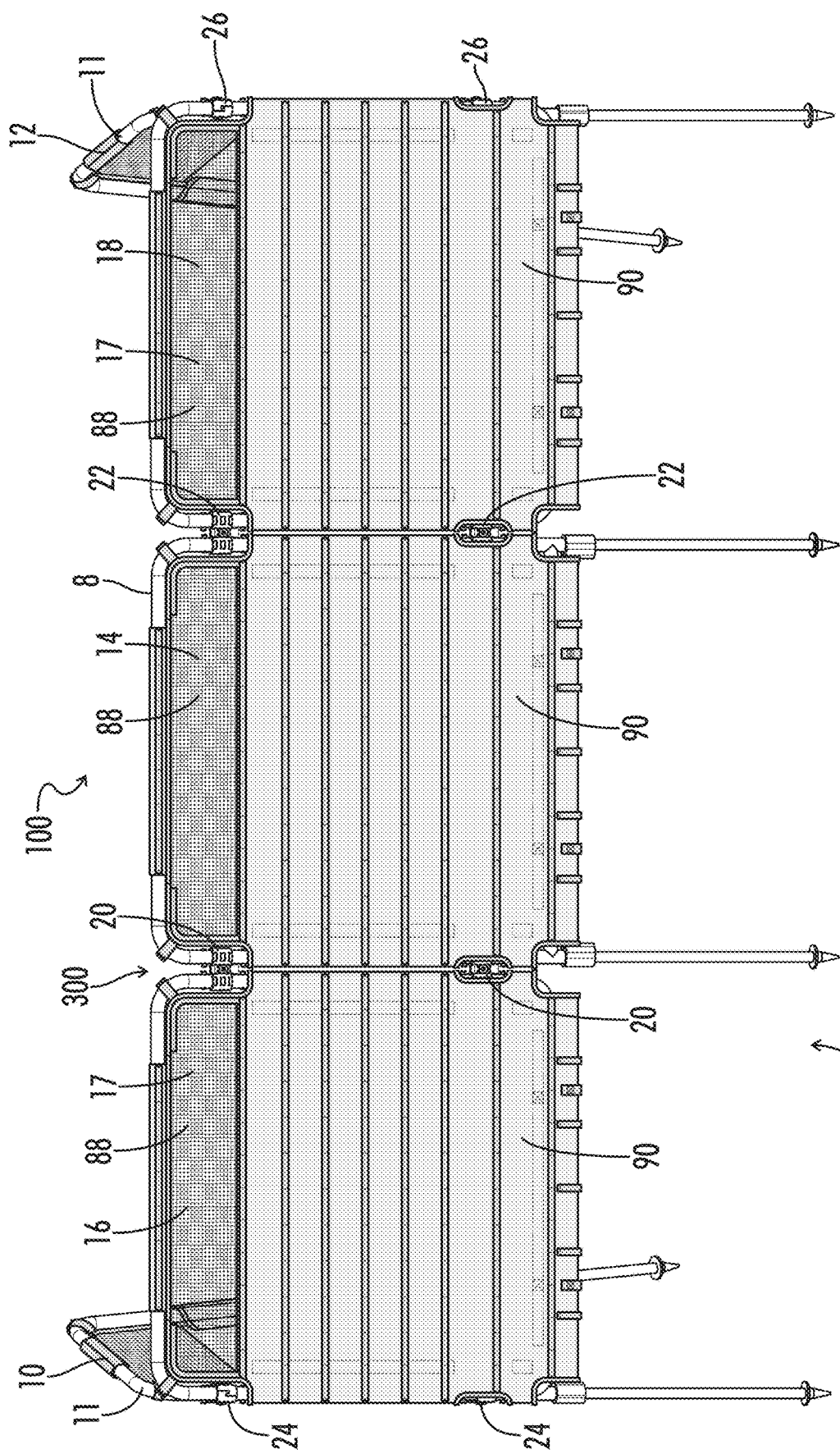
FIG. 3 is a front perspective view of the blind of FIG. 2 showing the fabric panel coverings in a retracted configuration.

Referring to FIGS. 1 through 3, hunting blind 100 includes a plurality of panels including opposing end panels 11 including a first panel 10 and a second panel 12, a middle panel 14, a pair of spacer panels 17 including a third panel 16 and a fourth panel 18, and a plurality of locking hinges 19 including a first pair of locking hinges 20 coupled to and between middle panel 14 and third panel 16, a second pair of locking hinges 22 coupled to and between middle panel 14 and fourth panel 18, a third pair of locking hinges 24 coupled to and between first panel 10 and third panel 16 and a fourth pair of locking hinges 26 coupled to and between second panel 12 and fourth panel 18. First pair of locking hinges 20 are configured for selectively preventing movement of middle panel 14 relative to third panel 16, second pair of locking hinges 22 are configured for selectively preventing movement of middle panel 14 relative to fourth panel 18, third pair of locking hinges 24 are configured for selectively preventing movement of first panel 10 relative to third panel 16, and fourth pair of locking hinges 26 are configured for selectively preventing movement of second panel 12 relative to fourth panel 18. In the depicted embodiment, five panels are utilized to form hunting blind 100. However, in embodiments not depicted, more or less panels are used in the formation of hunting blind 100. Further, panels may be arranged differently in their connections to adjacent panels relative to the depicted embodiment. For instance, first panel 10 may be connected to fourth panel 18, while second panel 12 is connected to third panel 16. In each instance where panels are connected, locking hinges 19 are used to selectively secure adjacent panels.

The shape of space 300 is determined by the number, surface angle, height, and hinge angle of panels of hunting blind 100. The number of panels may be varied, as discussed above. The surface angle, or angle of frame 8 of each panel relative surface 200, is altered based on the extension of each telescoping leg, as is described below in greater detail. Surface angles are in a range of about 75 degrees to about 90 degrees when hunting blind 100 is in use. Height of panel frames 8 above surface 200 is altered based on the extension of telescoping legs, as is described below in greater detail. Hinge angle, or the angle of a panel frame relative that of an adjacent panel frame, is determined by the position of each panel frame as locking hinge 19 is fastened. Thus, locking hinges 19 are configured to selectively lock adjacent panel frames into positions having a desired hinge angle. While hunting blind 100 is depicted in a U or C-shaped panel arrangement, other arrangements are compatible with the present disclosure.

FIG. 1 depicts hunting blind 100 in a lowered configuration, where lower sections 91 of fabric coverings 82 are raised and secured in a rolled or folded configuration. FIG. 2 depicts hunting blind 100 in a raised configuration, where lower sections 91 of fabric coverings 82 are extended and unsecured. While lower sections 91 are shown fully extended in the embodiment depicted in FIG. 2, lower portion 91 may be partially extended in embodiments not shown, such that lower portion 91 does not extend beyond surface 200. When lower section 91 is extended, at least one connector 98 is configured to selectively join fabric coverings 82 of adjacent panels. At least one connector 98 may be any reversible connection device or method, such as a clip, snap, buckle, tab, button, or hook-and-loop fastener. In FIG. 3, frame 8 is fully extended from surface 200 using telescoping legs, which are described below in greater detail. Further, lower sections 91 are retracted and secured in a rolled or folded configuration. While lower sections 91 are shown fully retracted in the embodiment depicted in FIG. 3, lower portion 91 may be partially retracted in embodiments not shown. In FIGS. 1 through 3, hunting blind 100 is viewed with its exterior surface 86 presented, exterior surface 86 having a camouflage or otherwise patterned opaque section 90 and a mesh section 88. Proportions of fabric covering 82 consisting of opaque section 90 and mesh section 88 that differ from those depicted are compatible with the present disclosure. Opaque section 90 is configured to provide cover and camouflage a hunter within space 300. Lower section 91 is configured to be extended and retracted as required by the hunter to provide desired cover. Further, lower section 91 is configured to be adjusted through extension and retraction to account for adjustments to frame height through telescoping leg extension and retraction. Mesh section 88 is configured to provide the hunter within space 300 with visibility, allowing the hunter to view the surrounding area and nearby game.

Figure 4:
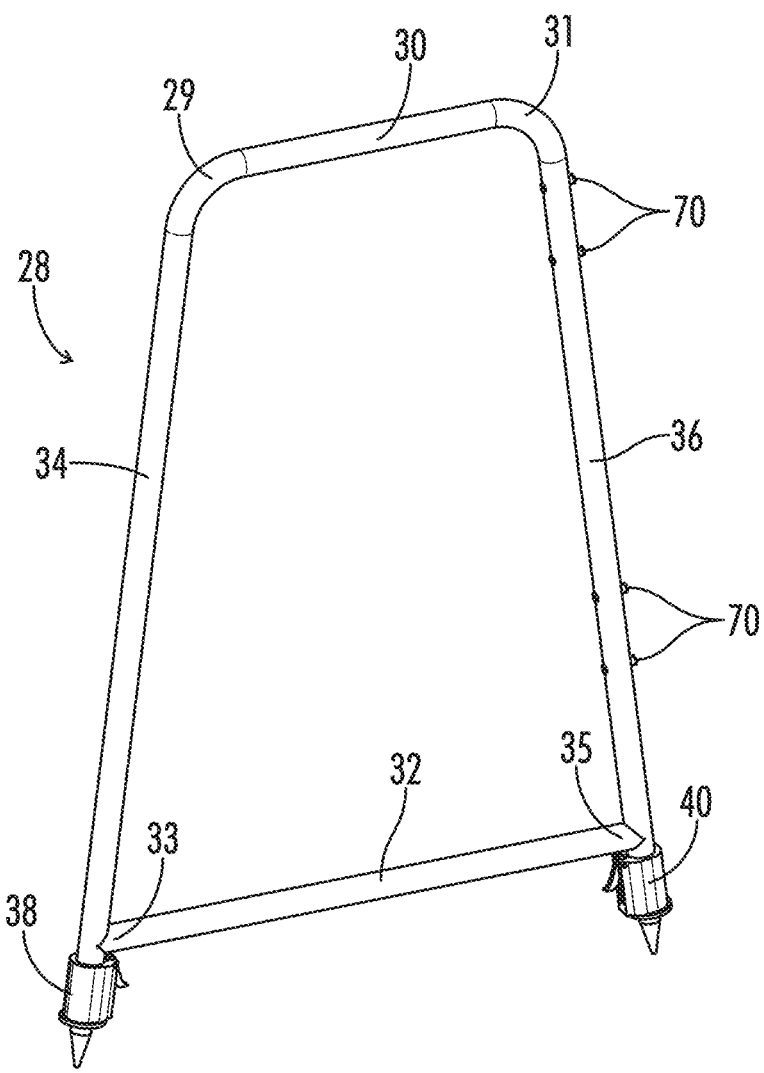
FIG. 4 is a front perspective view of an end panel frame of the blind of FIG. 1.
Figure 8:
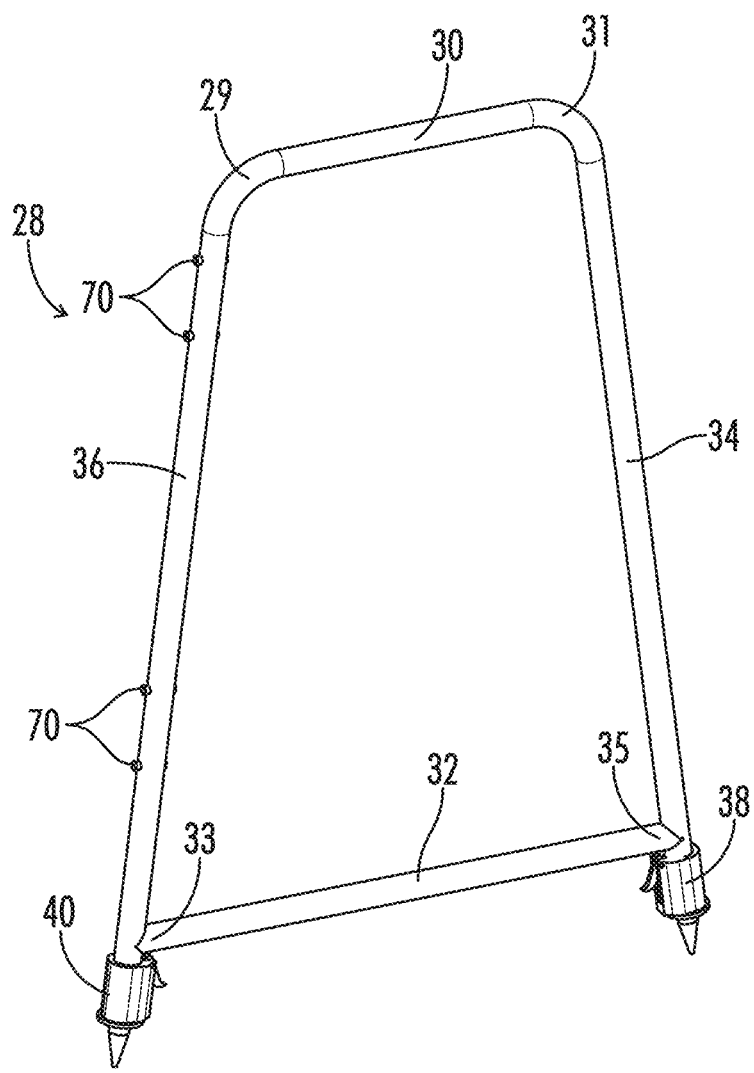
FIG. 8 is a front perspective view of another end panel frame of the blind of FIG. 1.
Figure 9:
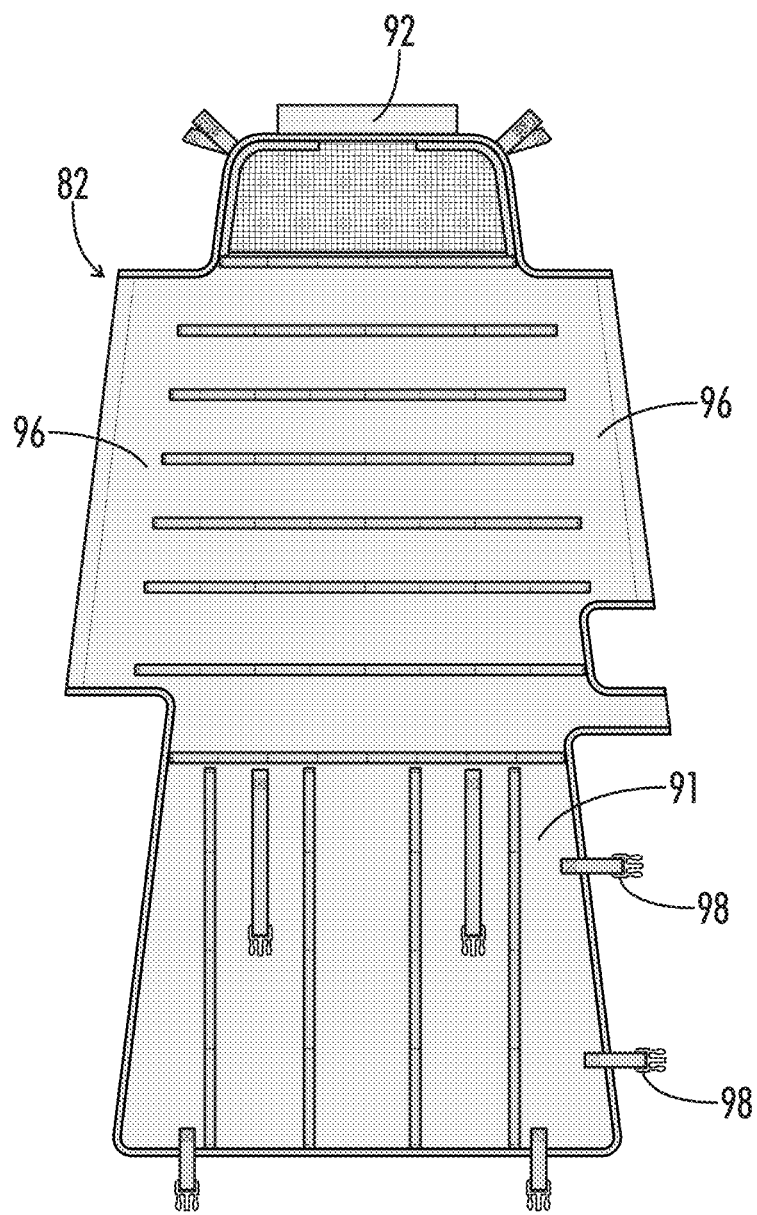
FIG. 9 is a front perspective view of a fabric panel covering for the end panel frame of FIG. 4.
Figure 10:
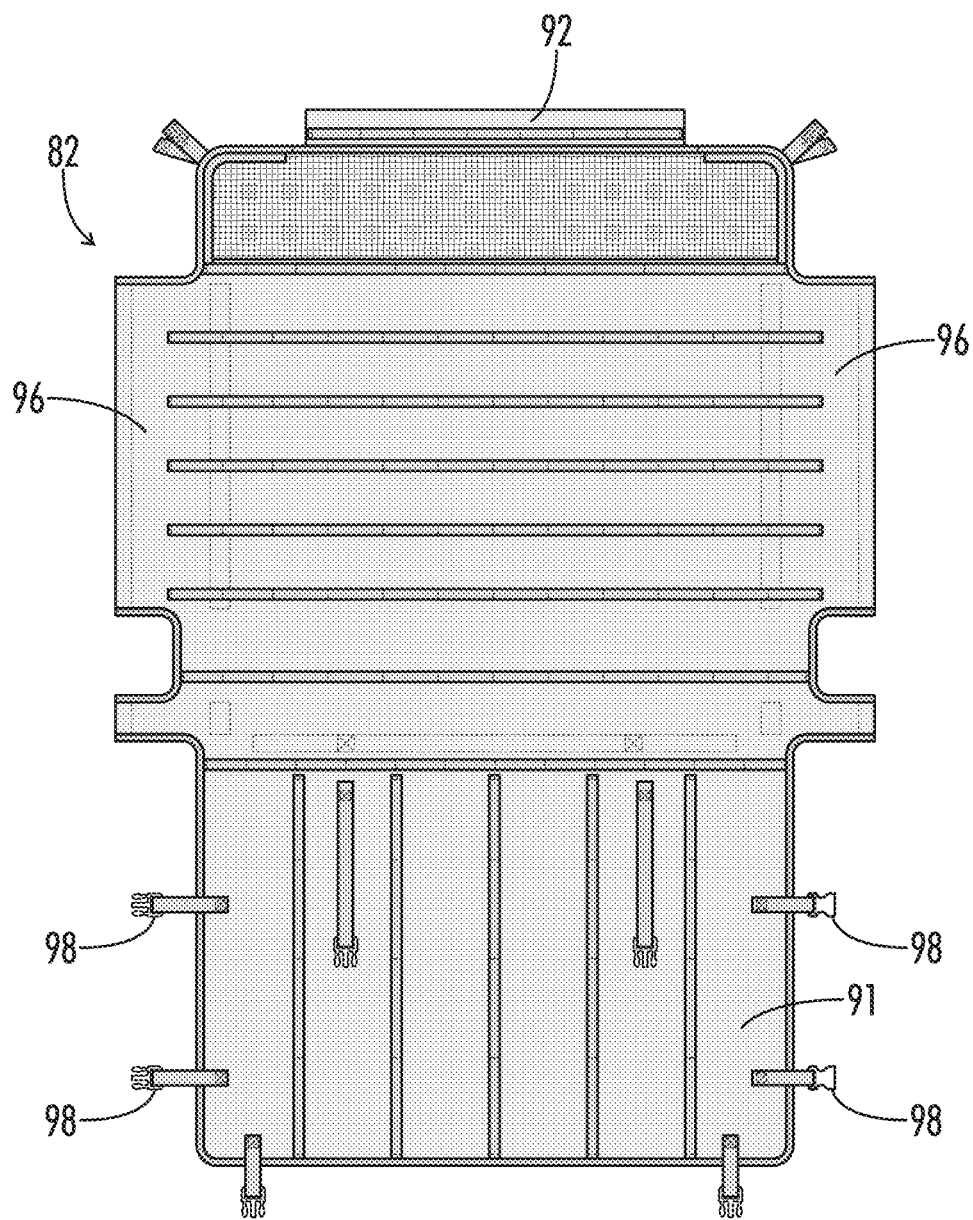
FIG. 10 is a front perspective view of a fabric panel covering for the spacer panel frame of FIG. 5.
Figure 11:
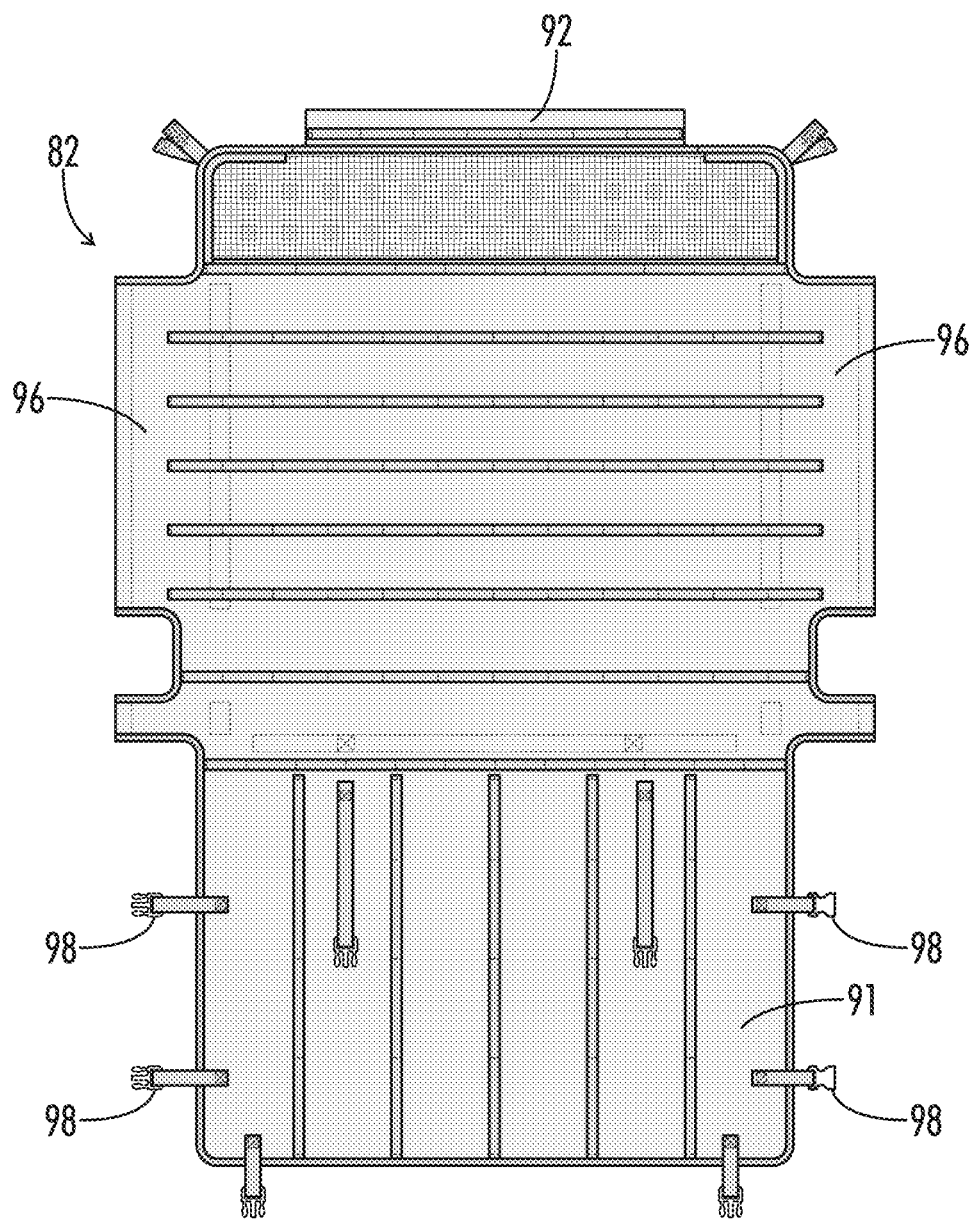
FIG. 11 is a front perspective view of a fabric panel covering for the middle panel frame of FIG. 6.
Figure 12:
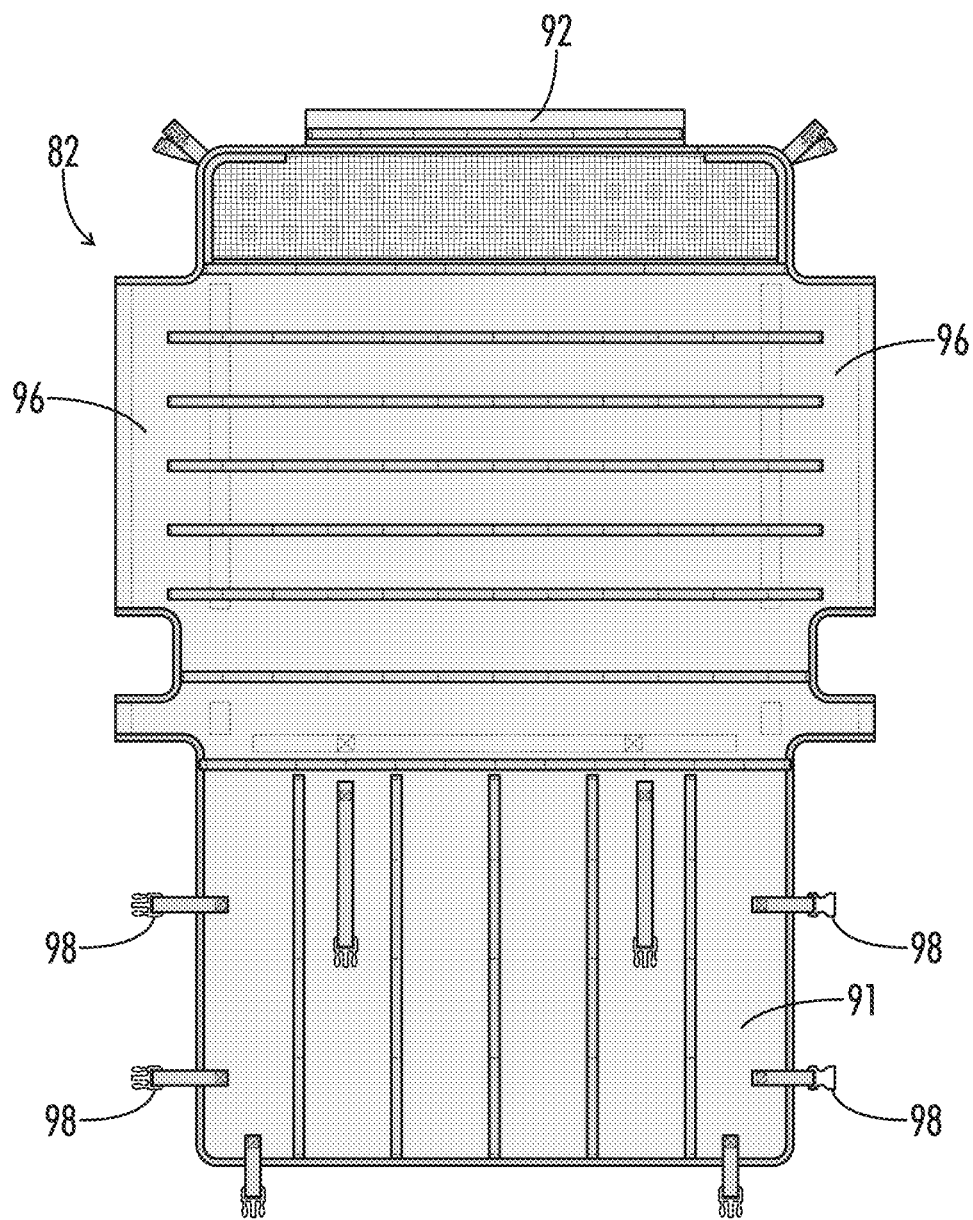
FIG. 12 is a front perspective view of a fabric panel covering for the spacer panel frame of FIG. 7.
Figure 13:
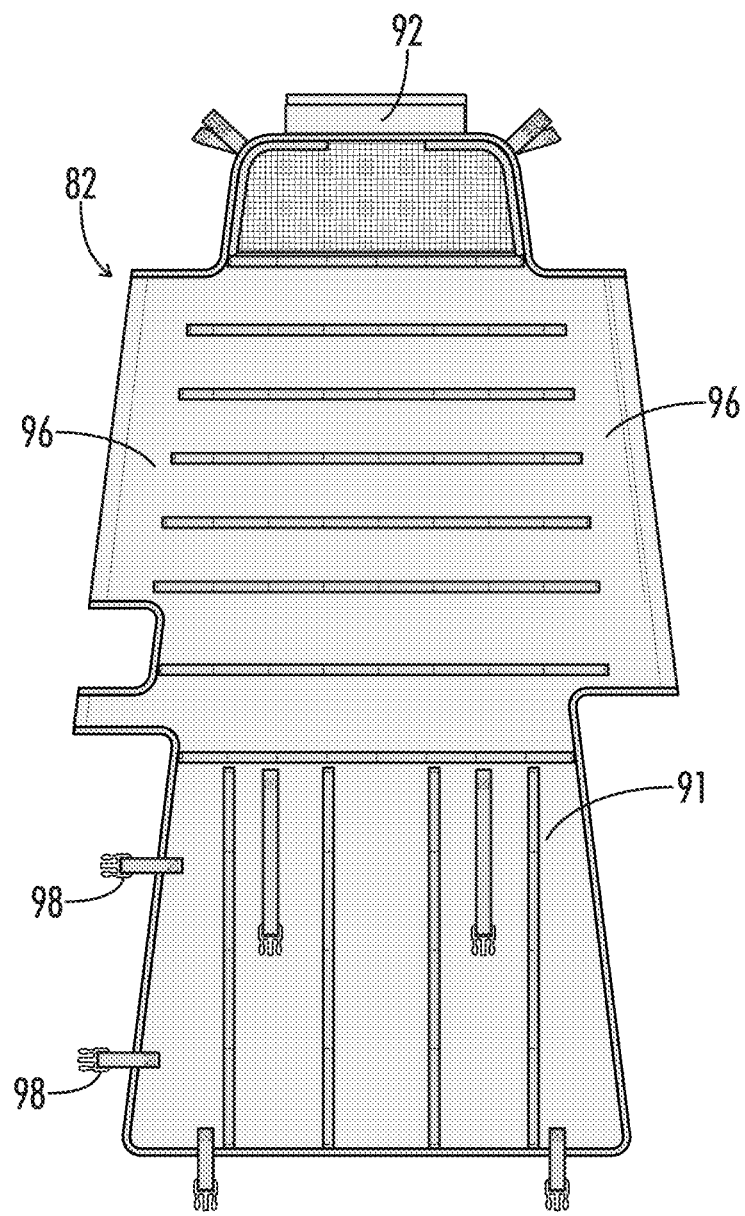
FIG. 13 is a front perspective view of a fabric panel covering for the end panel frame of FIG. 8.
Figure 14:
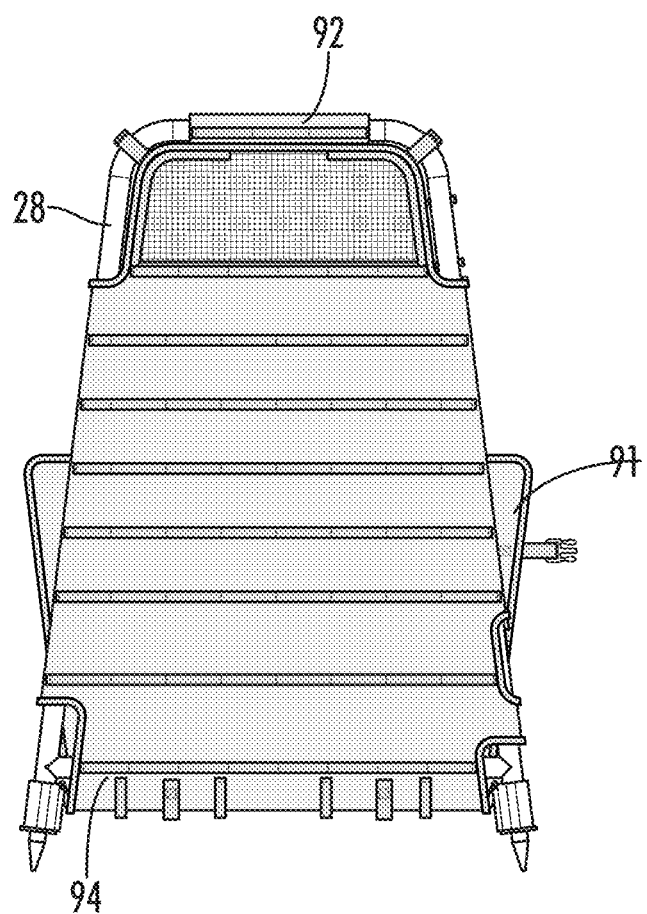
FIG. 14 is a front perspective view of the fabric panel covering of FIG. 9 in the retracted configuration assembled with the end panel frame of FIG. 4 to form an end panel.
Figure 15:
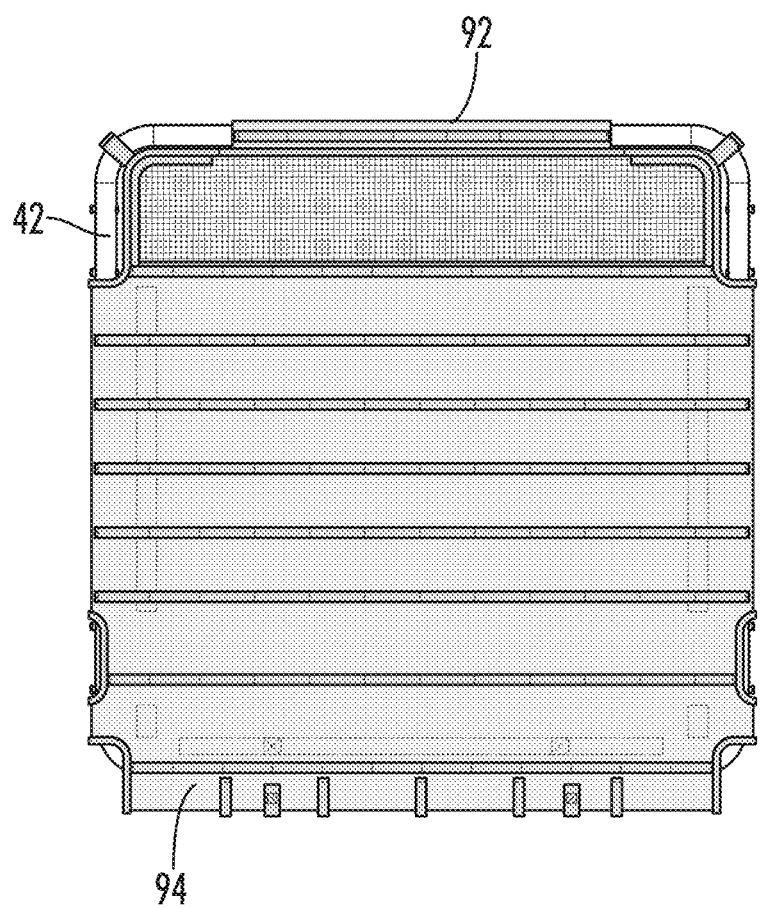
FIG. 15 is a front perspective view of the fabric panel covering of FIG. 10 in the retracted configuration assembled with the spacer panel frame of FIG. 5 to form a spacer panel.
Figure 16:
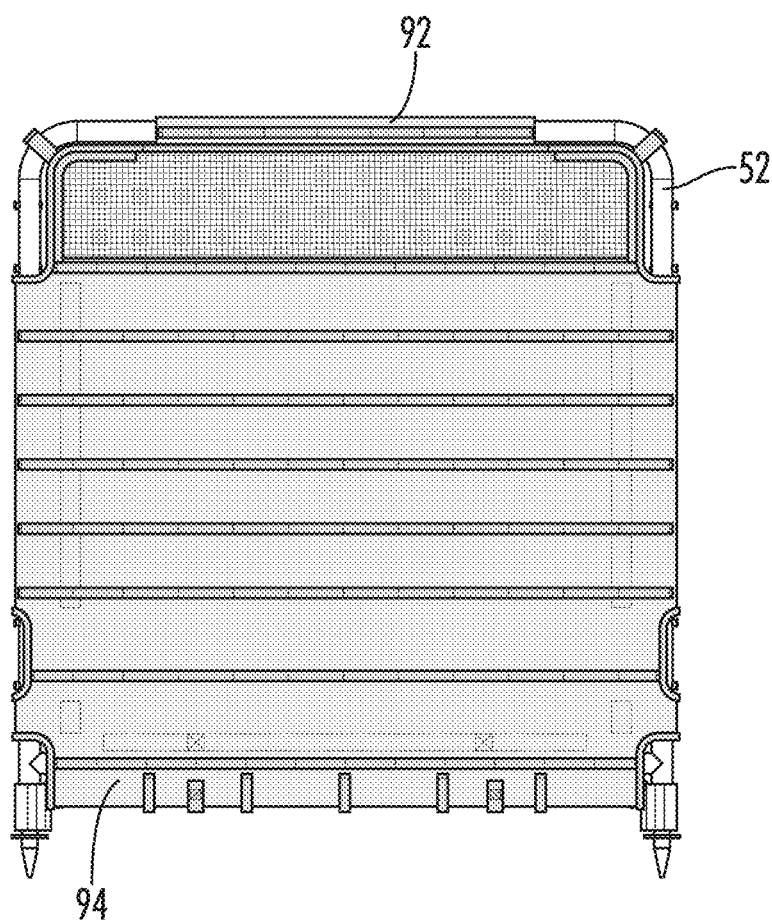
FIG. 16 is a front perspective view of the fabric panel covering of FIG. 11 in the retracted configuration assembled with the middle panel frame of FIG. 6 to form a middle panel.
Figure 17:
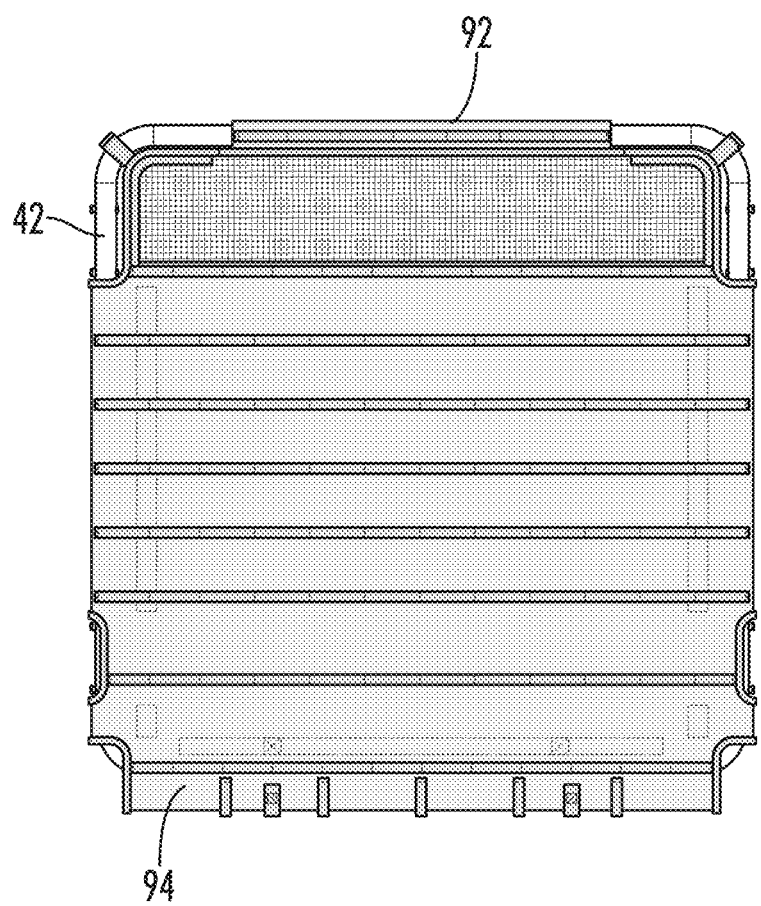
FIG. 17 is a front perspective view of the fabric panel covering of FIG. 12 in the retracted configuration assembled with the spacer panel frame of FIG. 7 to from another spacer panel.
Figure 18:
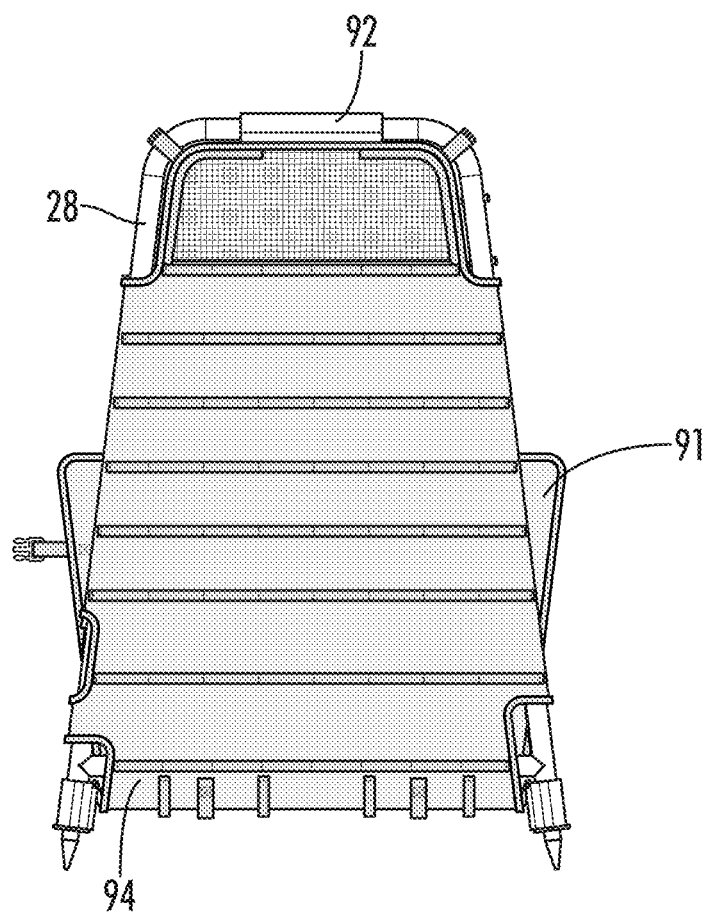
FIG. 18 is a front perspective view of the fabric panel covering of FIG. 13 in the retracted configuration assembled with the end panel frame of FIG. 8 to form another end panel.
Figure 19:
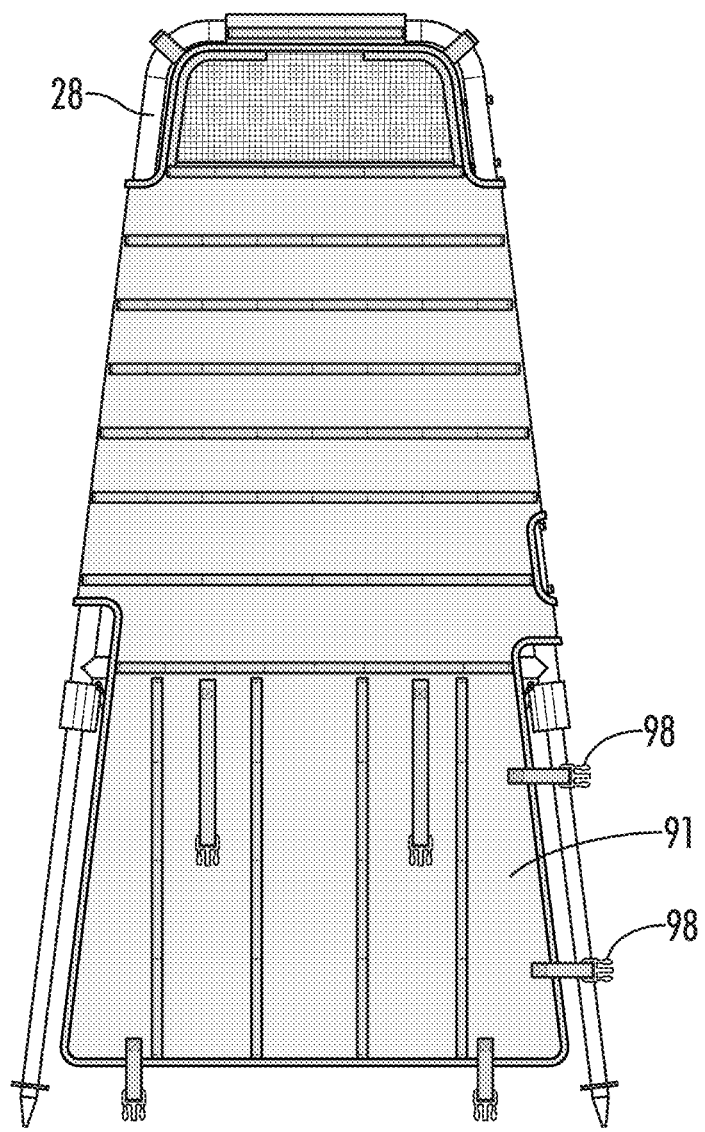
FIG. 19 is a front perspective view of the fabric panel covering of FIG. 9 in the fully extended configuration assembled with the end panel frame of FIG. 4 to form the end panel of FIG. 14.
Figure 20:
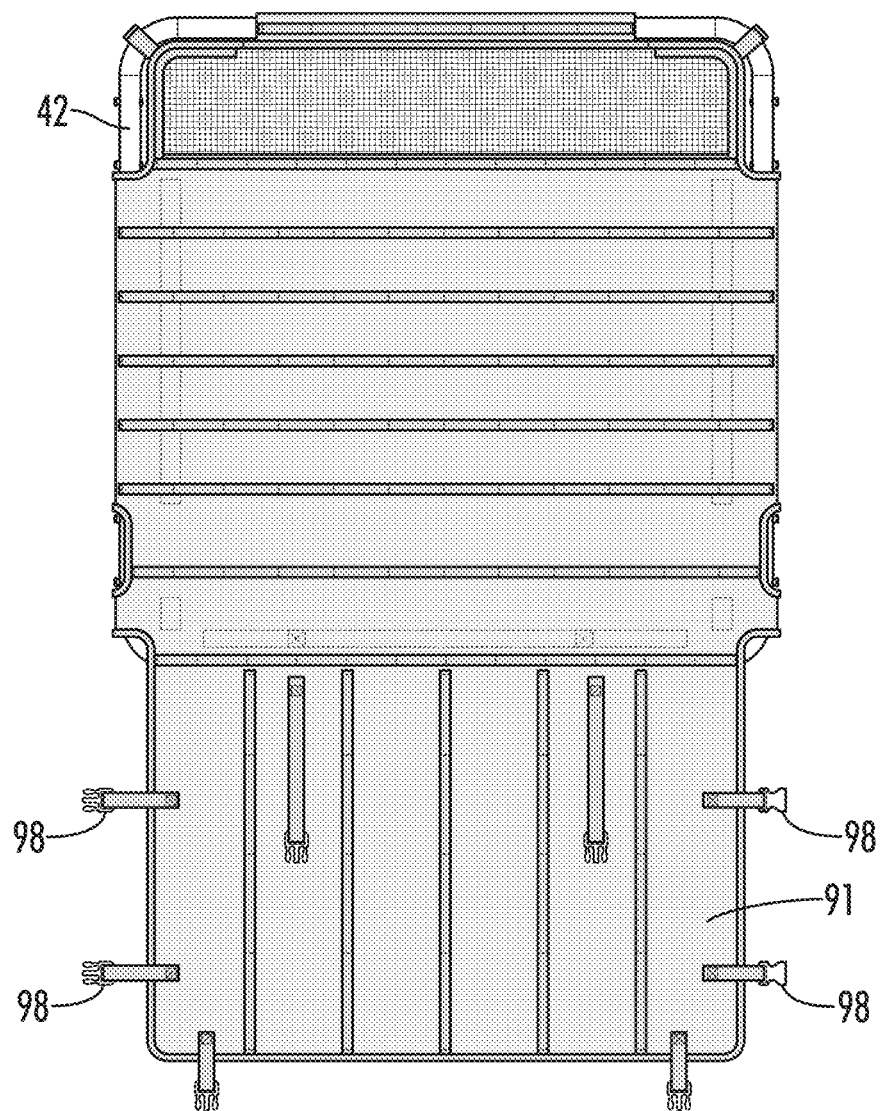
FIG. 20 is a front perspective view of the fabric panel covering of FIG. 10 in the fully extended configuration assembled with the spacer panel frame of FIG. 5 to form the spacer panel of FIG. 15.
Figure 21:
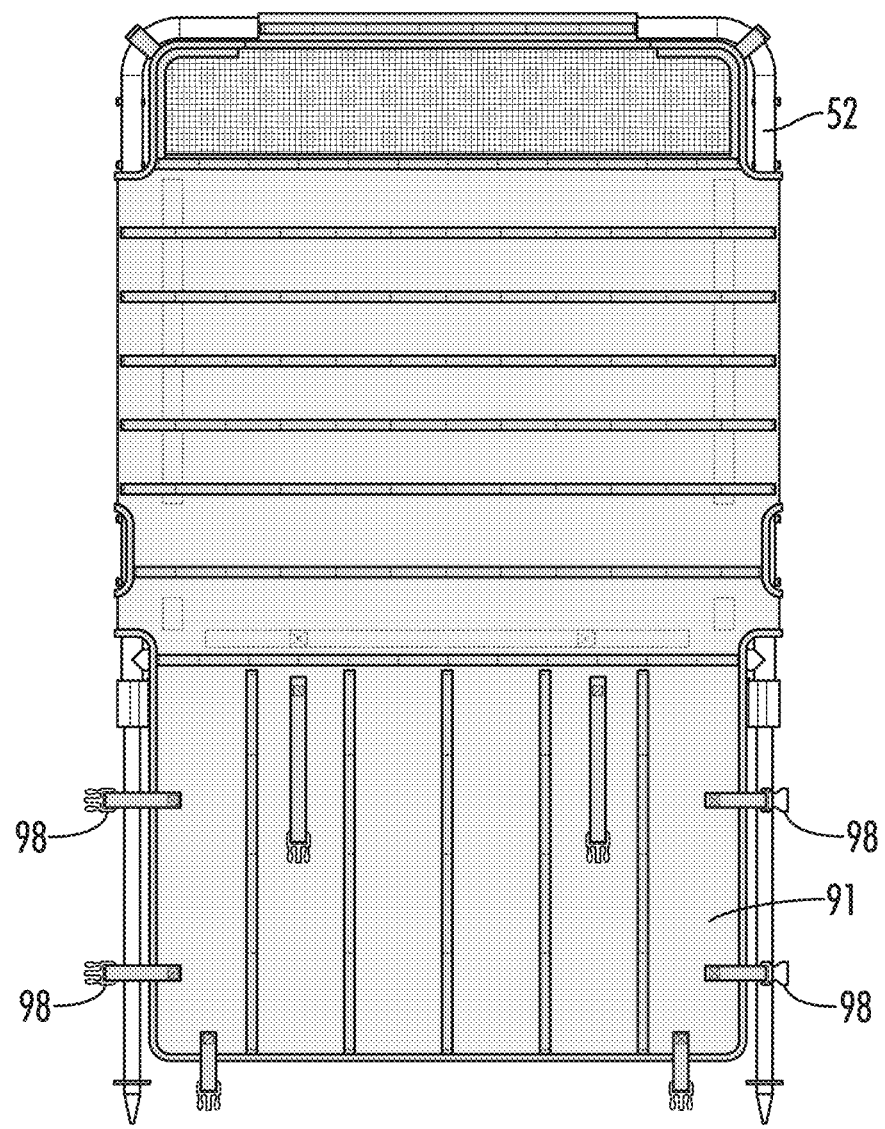
FIG. 21 is a front perspective view of the fabric panel covering of FIG. 11 in the fully extended configuration assembled with the middle panel frame of FIG. 6 to form the middle panel of FIG. 16.
Figure 22:
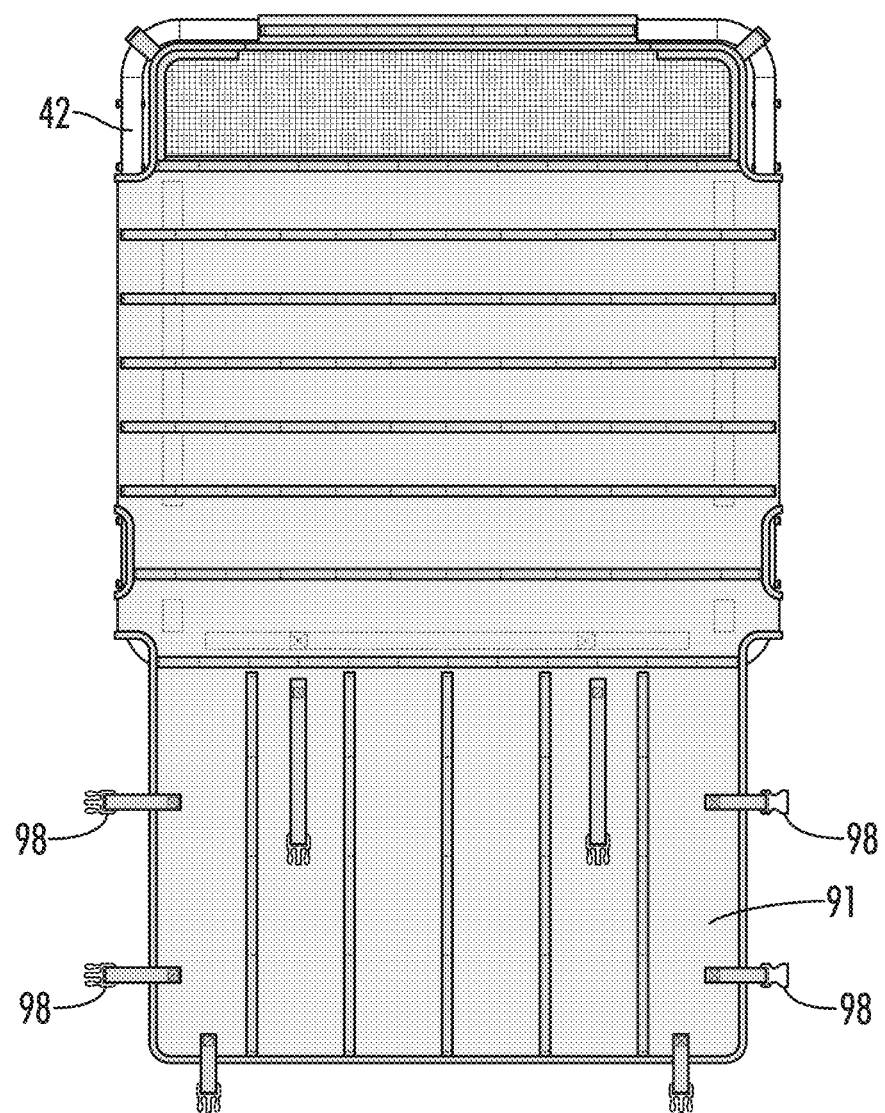
FIG. 22 is a front perspective view of the fabric panel covering of FIG. 12 in the fully extended configuration assembled with the spacer panel frame of FIG. 7 to form the spacer panel of FIG. 17.
Figure 23:
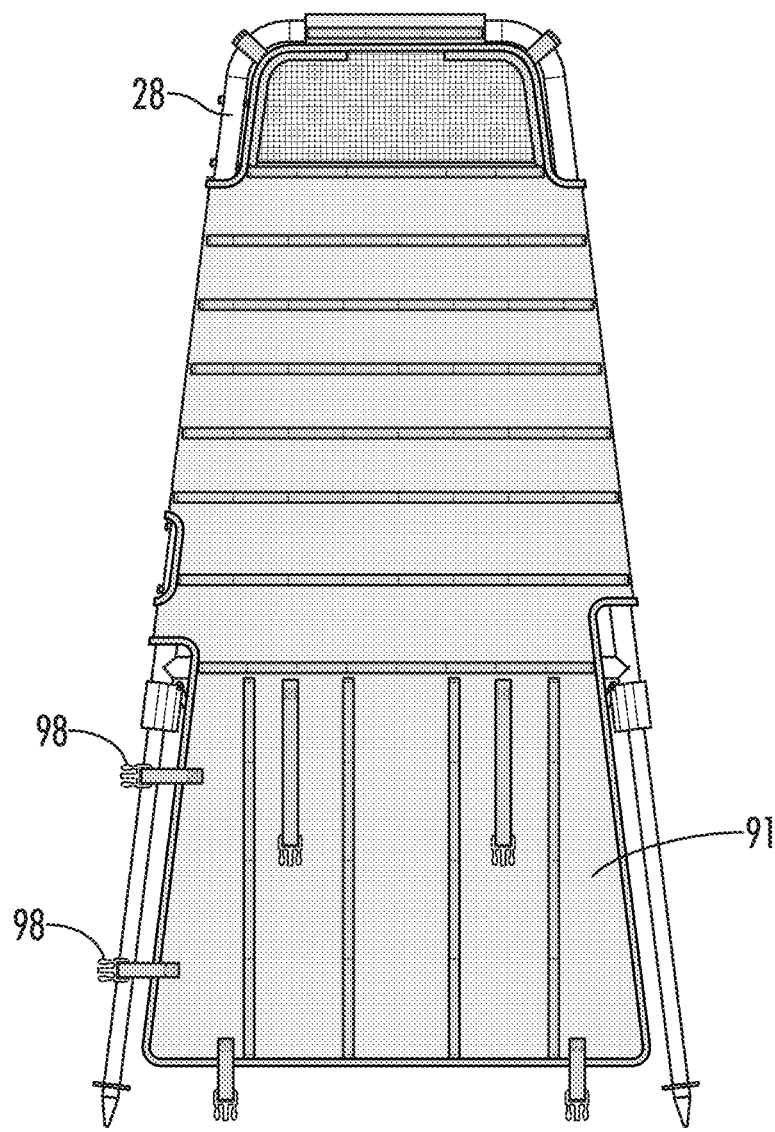
FIG. 23 is a front perspective view of the fabric panel covering of FIG. 13 in the fully extended configuration assembled with the end panel frame of FIG. 8 to form the end panel of FIG. 18.
Figure 24:
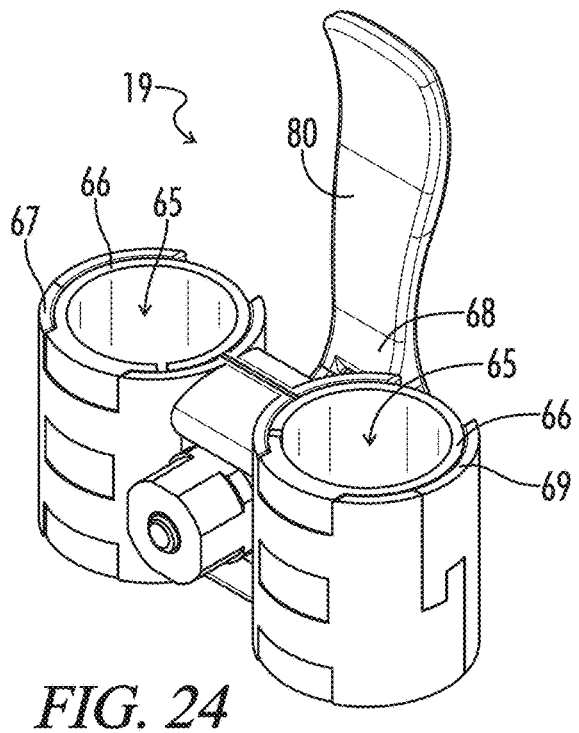
FIG. 24 is a perspective view of a locking hinge of the blind of FIG. 1.
Figure 25:
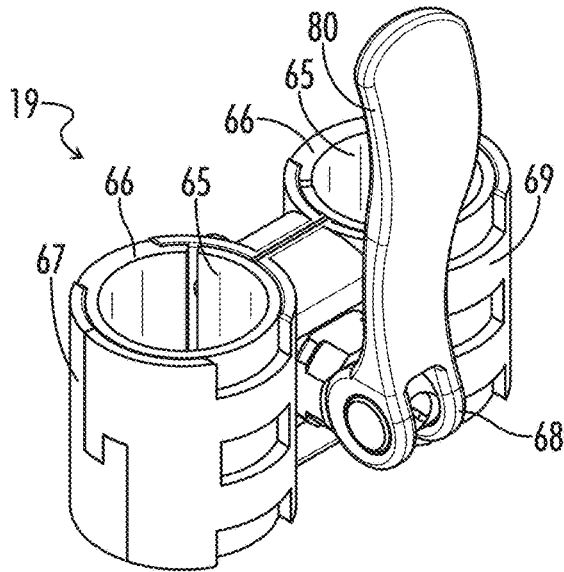
FIG. 25 is another perspective view of the locking hinge of FIG. 24.
Figure 26:
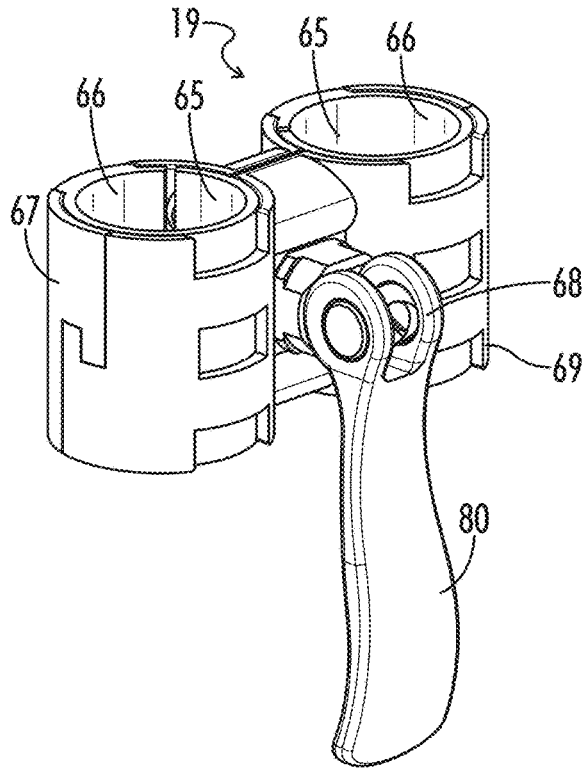
FIG. 26 is another perspective view of the locking hinge of FIG. 24.
Figure 27:
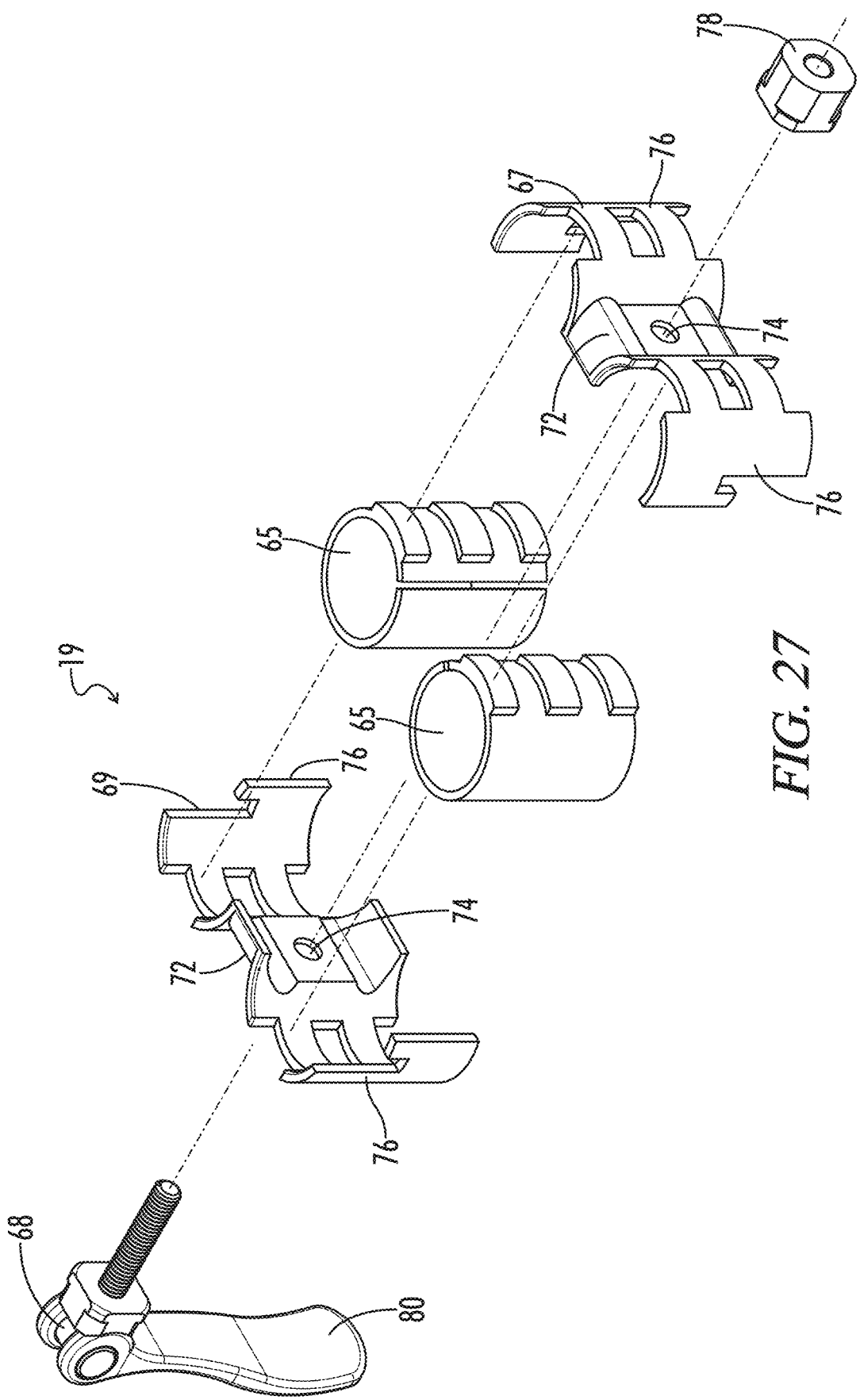
FIG. 27 is perspective view of the locking hinge of FIG. 24 disassembled.
Figure 28:
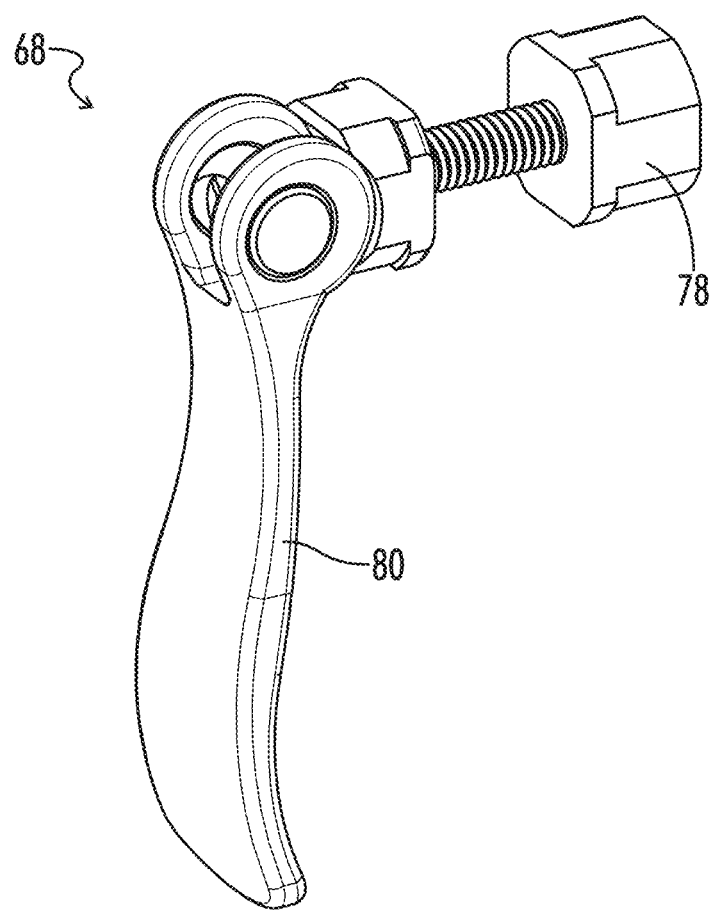
FIG. 28 is a perspective view of a cam lock bolt of the locking hinge of FIG. 24.
Figure 29:
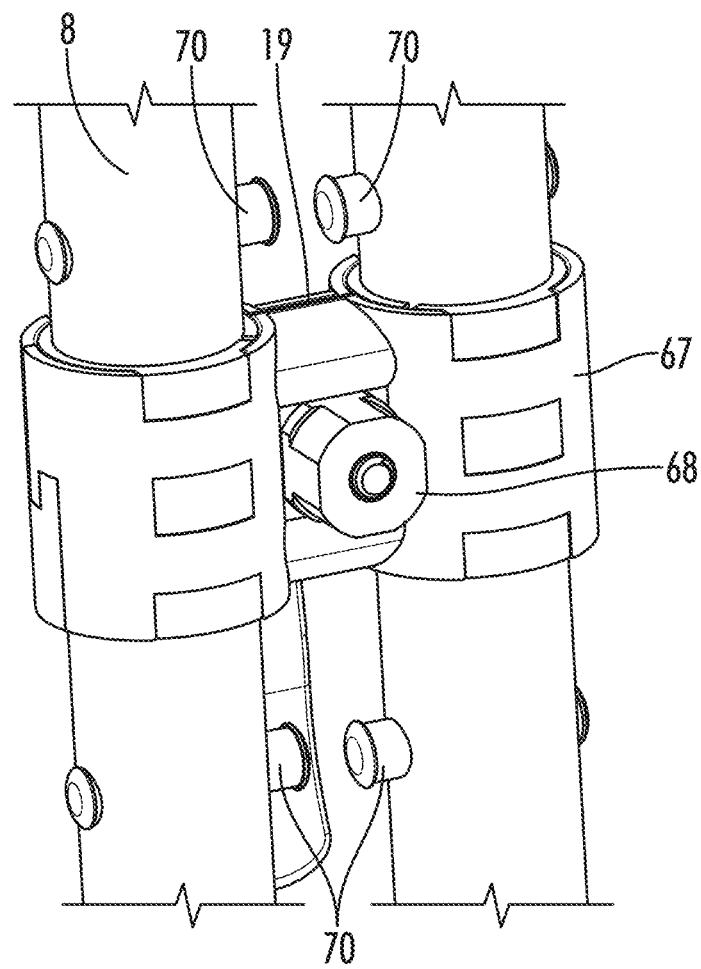
FIG. 29 is a front perspective view of a locking hinge coupled to and between a pair of adjacent panel frames.

Referring to FIGS. 4 and 8, each of first panel 10 and second panel 12 include a planar end panel frame 28 having an upper horizontal member 30, a lower horizontal member 32 having a length that is greater than a length of upper horizontal member 30, a first vertical member 34 extending to and between a first end 29 of upper horizontal member 30 and a first end 33 of lower horizontal member 32, and a second vertical member 36 extending to and between a second end 31 of upper horizontal member 30 and a second end 35 of lower horizontal member 32. Upper horizontal member 30 and lower horizontal member 32 are approximately parallel, with end panel frame 28 forming an approximately trapezoidal shape. Along first and second vertical members 34, 36 and facing outward are a plurality of pairs of frame protrusions 70 for placement and securing of locking hinges 19, as described below in greater detail. A telescoping first leg 38 is arranged to selectively extend downward from first vertical member 34, and a telescoping second leg 40 is arranged to selectively extend downward from second vertical member 36. The surface-facing end of each leg 38, 40 is acutely pointed for insertion into surface 200 and anchoring of blind 100 thereto. Legs 38, 40 can be extended and retracted independent of one another thereby allowing adjusting of the surface angle at which middle panel 14, third panel 16, and fourth panel 18 extend relative to surface 200 when blind 100 is in use. Legs 38, 40 can be selectively locked into a desired position using any means know in the art including, for example, a detent mechanism, a cam lock mechanism, a twist lock or locking cone lock mechanism, a pin lock mechanism, a lever lock or clamp lock mechanism. Legs 38, 40 are configured to be fully extended, fully retracted, or partially extended. Thus, the height of end panel frame 28 relative surface 200 is variable based on the extension of each of legs 38, 40.

Figure 5:
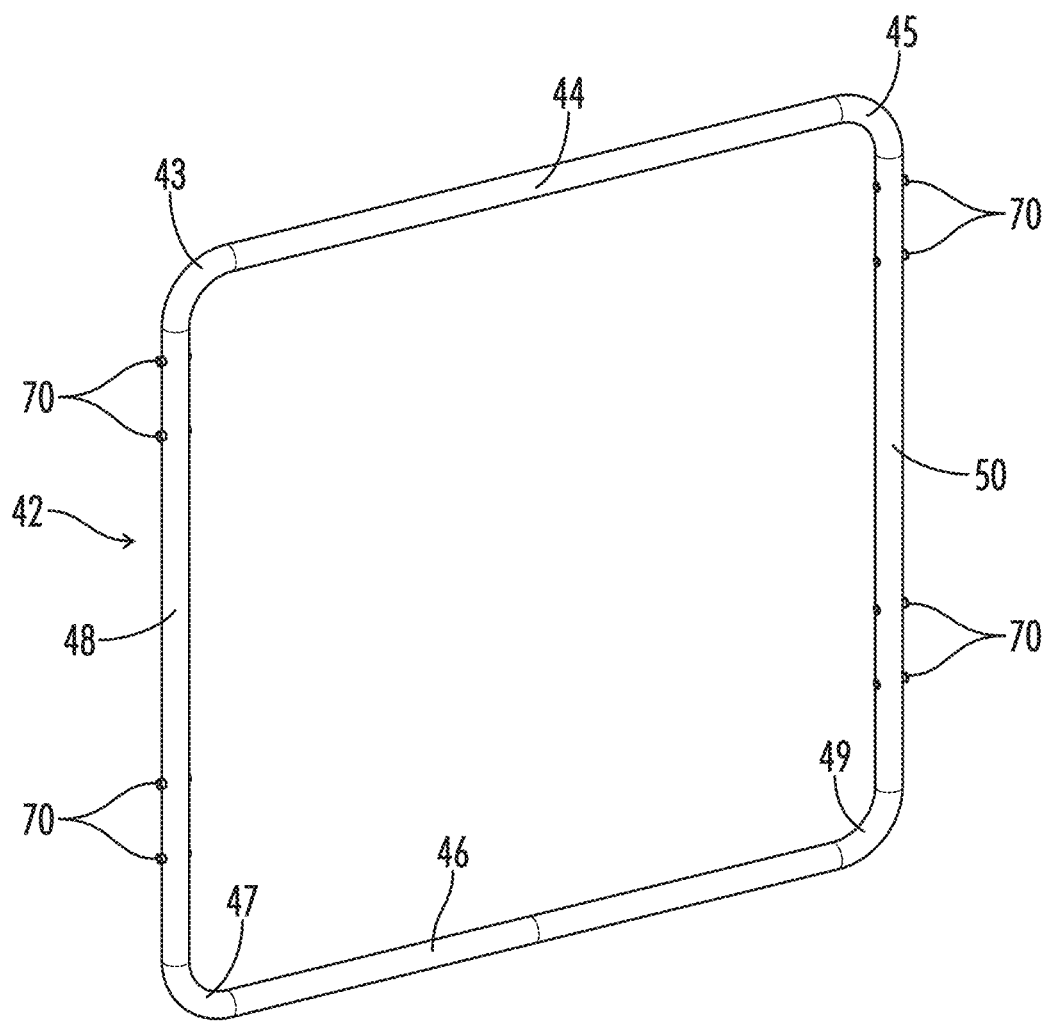
FIG. 5 is a front perspective view of a spacer panel frame of the blind of FIG. 1.
Figure 7:
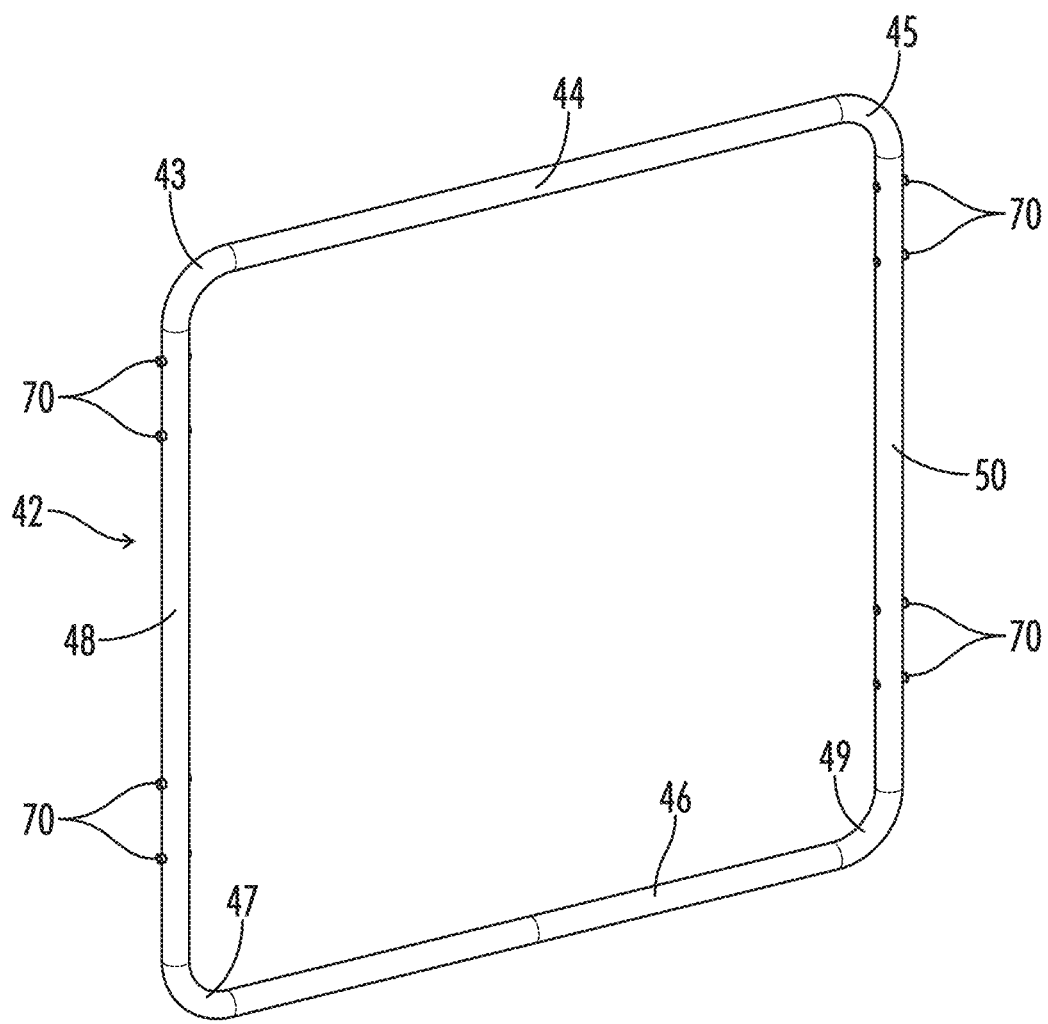
FIG. 7 is a front perspective view of another spacer panel frame of the blind of FIG. 1.

Referring to FIGS. 5 and 7, each of third panel 16 and fourth panel 18 include a planar rectangular, trapezoidal, or square spacer panel frame 42 having an upper horizontal member 44, a lower horizontal member 46, a first vertical member 48 extending to and between a first end 43 of upper horizontal member 44 and a first end 47 of lower horizontal member 46, and a second vertical member 50 extending to and between a second end 45 of upper horizontal member 44 and a second end 49 of lower horizontal member 46. Upper horizontal member 44 and lower horizontal member 46 are approximately parallel, with spacer panel frame 42 forming an approximately rectangular, trapezoidal, or square shape. Along first and second vertical members 48, 50 and facing outward are a plurality of pairs of frame protrusions 70 for placement and securing of locking hinges 19, as described below in greater detail. When blind 100 is in use, spacer panel frame 42 is elevated above surface 200 so that no portion of rectangular spacer panel frame 42 rests directly upon surface 200. Panels 16 and 18 and spacer panel frames 42 do not include legs or telescoping legs. However, the height of panels 16 and 18 and spacer panel frames 42 relative surface 200 are altered when telescoping legs of other panels of hunting blind 100 are extended or retracted. Similarly, the angle of the plane of spacer frame 42 relative surface 200 is altered when telescoping legs of other panels of hunting blind 100 are extended or retracted.

Figure 6:
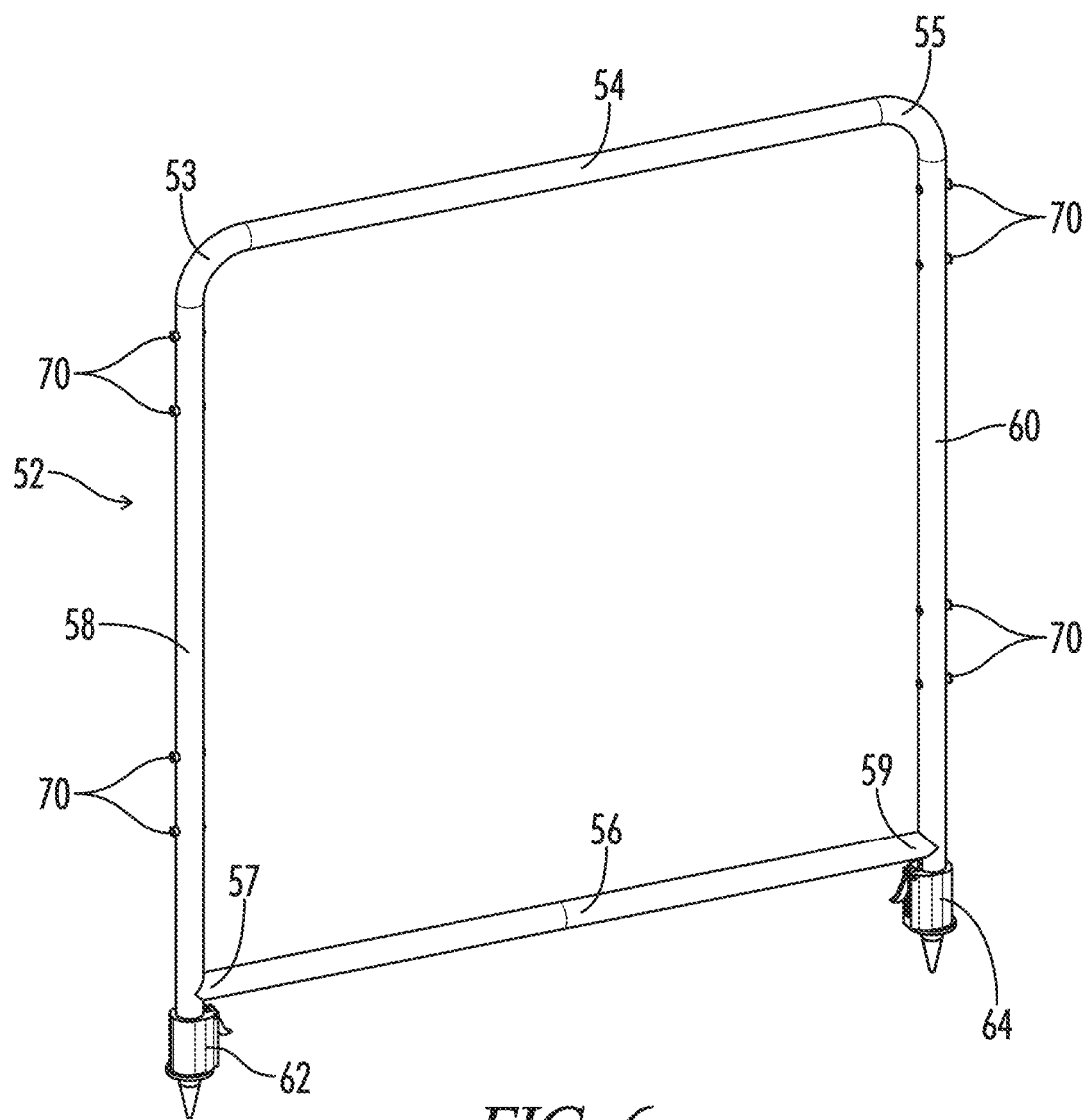
FIG. 6 is a front perspective view of a middle panel frame of the blind of FIG. 1.

Referring to FIG. 6, middle panel 14 includes a rectangular, trapezoidal, or square middle panel frame 52 defining a plane and having an upper horizontal member 54, a lower horizontal member 56, a first vertical member 58 extending to and between a first end 53 of upper horizontal member 54 and a first end 57 of lower horizontal member 56, and a second vertical member 60 extending to and between a second end 55 of upper horizontal member 54 and a second end 59 of lower horizontal member 56. Upper horizontal member 54 and lower horizontal member 56 are approximately parallel, with middle panel frame 52 forming an approximately square, trapezoidal, or rectangular shape. Along first and second vertical members 58, 60 and facing outward are a plurality of pairs of frame protrusions 70 for placement and securing of locking hinges 19, as described below in greater detail. A telescoping first leg 62 and telescoping second leg 64 extend out from first and second vertical members 58, 60, respectively, adjacent to their intersections with lower horizontal member 56. Telescoping legs 62, 64 are configured for selectively extending downwardly therefrom along the plane for supporting blind 100 on surface 200. The surface-contacting end of each of leg 62, 64 is acutely pointed for insertion into surface 200 and for anchoring blind 100 thereto. Legs 62, 64 can be extended and retracted independent of one another. Legs 62, 64 can be selectively locked into a desired position using any means know in the art. In combination with legs 38, 40, legs 62, 64 are used to raise and lower first panel 10, second panel 12, middle panel 14, third panel 16, and fourth panel 18 to provide blind 100 with a desired height. Furthermore, because the legs 38, 40, 62, and 64 are independently actuatable, blind 100 may be firmly supported on uneven surfaces with panels 14, 16 and 18 oriented essentially horizontally. Legs 62, 64 are configured to be fully extended, fully retracted, or partially extended. Thus, the height of middle panel frame 52 relative surface 200 is variable based on the extension of each of legs 62, 64.

Referring to FIGS. 24 through 29, each locking hinge 20, 22, 24 and 26 of the plurality of locking hinges 19 includes a pair of panel frame member receiving pathways 65, each pathway being configured for receiving a vertical frame member of a pair adjacent panels for selectively pivotally coupling the pair of adjacent panels together. The pair of panel frame member receiving pathways 65 are formed by bushings 66 disposed between a pair of metal opposing plates 67, 69. Each plate 67, 69 includes a central portion 72 having a hole 74 therethrough and opposing wing sections 76 extending out laterally from central portion 72. Each opposing wing section 76 has a semi-circular cross-section so that when plates 67, 69 are coupled to one another, a cylindrical pathway 65 is formed therebetween for receiving a bushing 66. A cam lock bolt 68 is inserted through holes 74 in plates 67, 69 for fixing plates 67, 69 together and, when in use, selectively compressing each of bushings 66 between pair of opposing plates 67, 69.

To assemble the hinges with the vertical frame members, the adjacent vertical frame members are inserted into bushings 66 through a split in each bushing sidewall. To ensure proper placement of bushings 66 along the vertical frame members, bushings 66 are located between pairs of panel frame protrusions 70 extending from the vertical frame members. Panel frame protrusions 70 are spaced such that bushings 66 fit between pairs of protrusions 70, and such that pairs of protrusions 70 on adjacent frames 8 are aligned for panel attachment. Protrusions 70 exist in at least one pair on vertical frame members, and extend outward from frame 8. However, in some embodiments, protrusions are outward facing, inward facing, front facing, back facing, or a combination thereof. The extension of protrusions 70 from frame 8 is such that bushings 66, when placed on vertical frame members, are secured in a location between protrusions 70.

For assembly of hunting blind 100, plates 67, 69 are arranged on opposing sides of bushings 66 on vertical frame members and pressed against bushings 66. Cam lock bolt 68 is then inserted into holes 74 of plates 67, 69. A nut 78 is tightened onto cam lock bolts 68 to couple and maintain plates 67, 69 in place about bushings 66. Lever 80 of cam lock bolt 68 is then used to selectively compress bushings 66 when it is desired to prevent movement between adjacent panels and decompress bushings 66 when it is desired to allow pivoting between the adjacent panels. In this manner, a user adjusts a hinge angle between adjacent panels by pivoting panels when lever 80 has decompressed bushings 66, and the user sets the hinge angle by using lever 80 to compress bushings 66 and lock adjacent panels into position. Locking hinges 19 are removable from frames 8 by removing nut 78 of cam lock bolt 68, removing cam lock bolt 68 from holes 74, disassembling plates 67, 69, and removing bushings 66.

Figure 30:
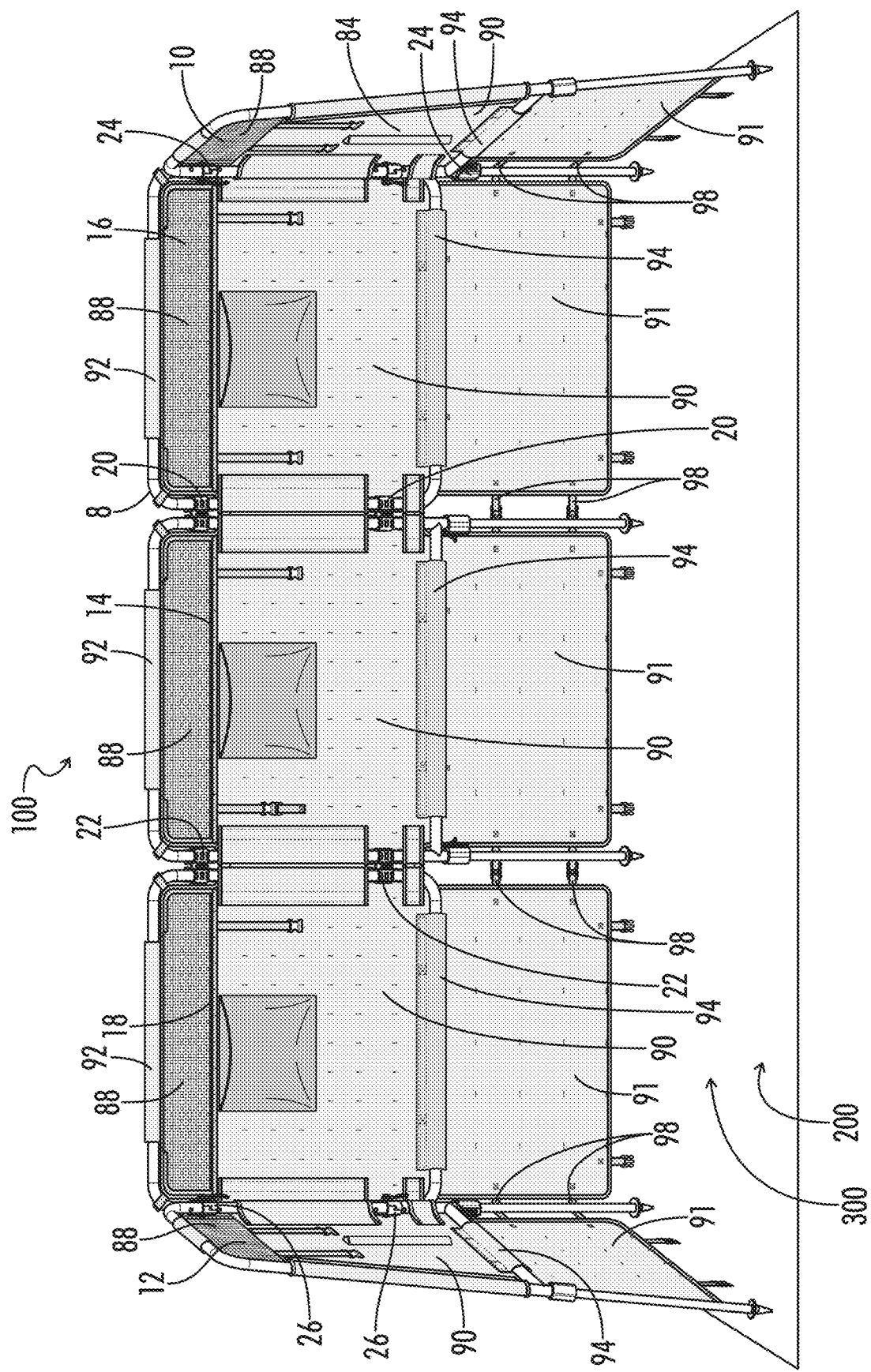
FIG. 30 is a rear perspective view of the blind of FIG. 2 in a raised configuration showing fabric panel coverings on the panels fully extended.

Referring to FIGS. 1 through 3 and 9 through 23, each panel of the plurality of panels includes a fabric covering 82 having an exterior surface 86, an interior surface 84, and a mesh upper section 88 through which a hunter can see and an opaque section 90 therebelow. Exterior surface 86 is arranged to face an animal being hunted and includes a camouflage pattern. In FIG. 30, interior surface 84 optionally includes pockets or storage compartments for storing items about opaque section 90. Referring to FIGS. 9 through 23 and 30, each fabric covering 82 includes lateral sleeve portions 96 formed at the opposing lateral edges thereof for coupling fabric covering 82 to the vertical members of the frames, an upper sleeve portion 92 formed at the upper edge thereof for coupling fabric covering 82 to an upper horizontal frame member of the frames and a lower sleeve portion 94 formed at the lower edge thereof for coupling fabric covering 82 to the lower horizontal frame member of the frames. The sleeves are formed by elongate fabric flaps arranged to wrap around a frame member 8 and secure back to fabric covering 82 using snaps, hook and pile or other suitable fastening mechanism. Connectors 98 are provided at the edges of fabric coverings 82 for securing adjacent fabric coverings together. Thus, each panel of the plurality of panels may be covered by a corresponding fabric covering 82, which is separated from other fabric coverings when connectors 98 are not fastened. When adjacent panels are connected, adjacent fabric coverings 82 are configured to be connected using connectors 98.

Figure 31:
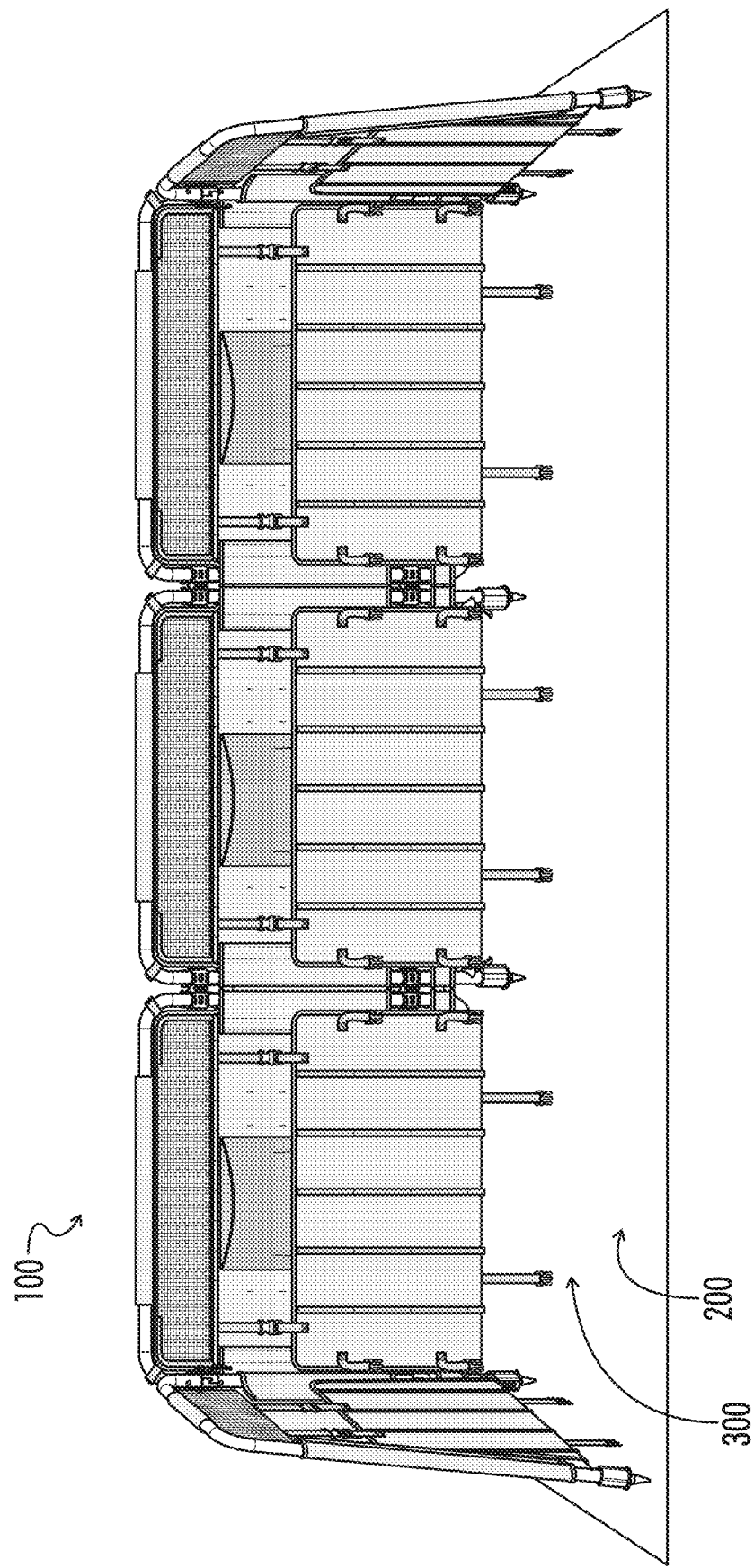
FIG. 31 is a rear perspective view of the blind of FIG. 1 showing the fabric panel coverings in the retracted configuration.
Figure 32:
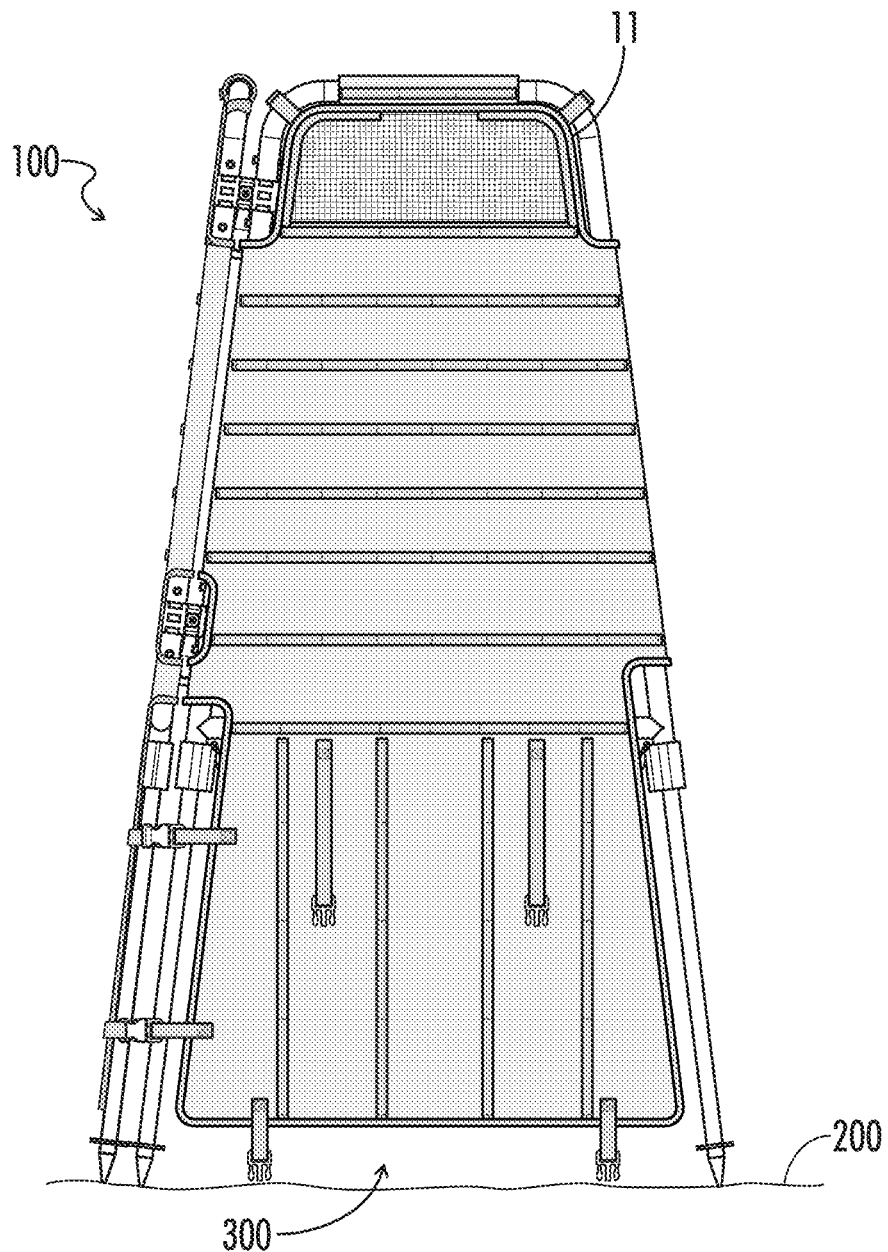
FIG. 32 is a side perspective view of the blind of FIG. 2 in a raised configuration showing fabric panel coverings on the panels fully extended.
Figure 33:
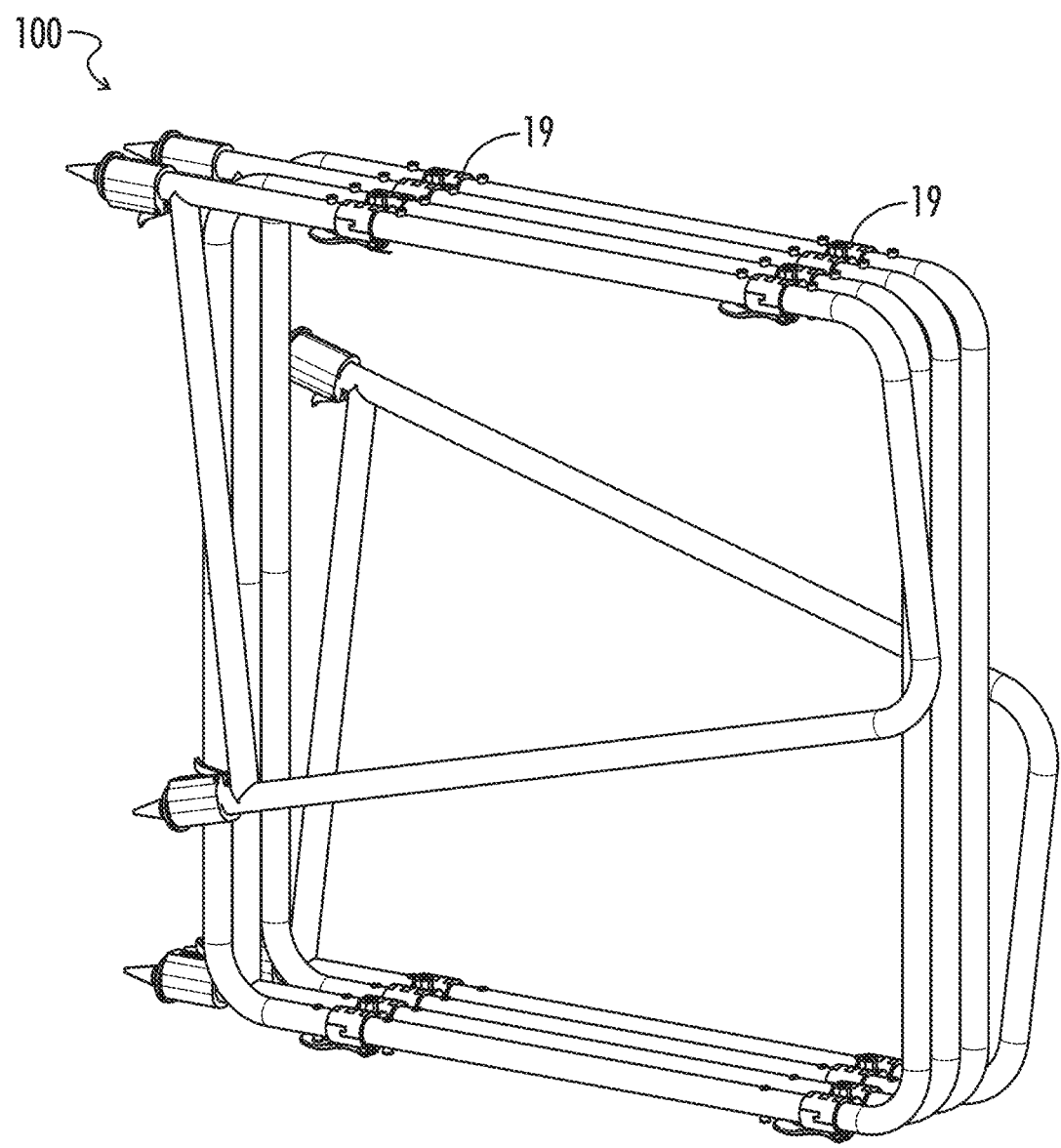
FIG. 33 is a perspective view of the blind of FIG. 1 in a collapsed configuration.

Referring to FIGS. 2 and 3, blind 100 includes a raised configuration when telescoping legs 62, 64 of middle panel 42 and telescoping legs 38, 40 of end panels 10, 12 are extended and a lowered configuration when telescoping legs 62, 64 of middle panel 14 and telescoping legs 38, 40 of end panels 10, 12 are retracted. Referring to FIGS. 1 and 31, when in the lowered configuration, a lower section 91 of opaque section 90 is rolled or folded upward and secured in a rolled or folded upward arrangement. Fasteners or connectors are optionally used to secure lower section 91. Referring to FIGS. 2, 30 and 32, when blind 100 is changed from the lowered configuration to the raised configuration, fabric covering 82 is converted to an unrolled or unfolded arrangement, where lower section 91 is extended, unfolded, and unrolled. In FIG. 33, hunting blind 100 is depicted in a stowed configuration for travel and storage. In the stowed configuration, panel frames 8 are connected with locking hinges 19 placing panels in a folded arrangement. In other instances, locking hinges are not present on frames 8 for storage, and frames 8 are secured with a strap, case, container, harness, or other securing and stowing means. Handles are optionally attached for ease of carrying hunting blind 100 between locations.

Figure 34:
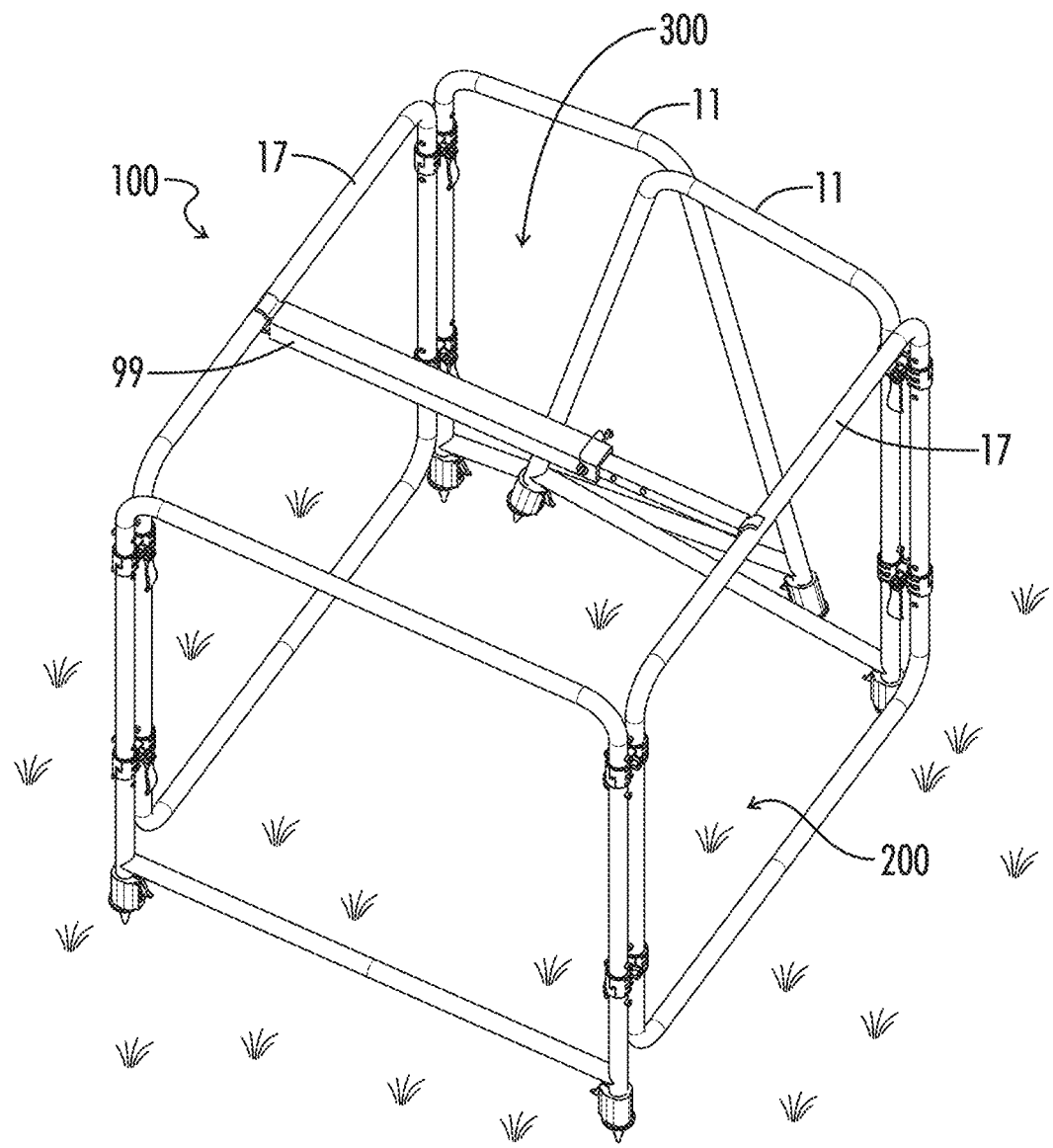
FIG. 34 is a perspective view of a pair of blinds in accordance with the present invention coupled together to form a continuous blind sidewall.

Referring to FIG. 34, blind 100 is coupled to form a continuous blind sidewall that surrounds a hunter 360°. In the depicted embodiment, one blind 100 is used, though two or more blinds 100 are configured into a continuous blind sidewall in other embodiments. Blinds 100 are arranged with the concave sides thereof facing one another and then fixed together by a brace 99 composed a telescoping arm with opposing ends configured for attachment to a respective upper horizontal member of panel frame 8 of each of blind 100. The telescoping arm can be selectively locked to provide brace 99 with a desired length for configuring the space 300 as desired. In the assembly of hunting blind 100, no upper covering is required. Further, as shown in FIGS. 1 through 3, in the U or C-shaped arrangement, hunting blind 100 functions without the use of upper support structures or coverings. However, in embodiments not depicted, upper coverings are available to shelter a hunter within space 300 from wind, rain, sun, or other environmental elements.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

We claim:

1. A hunting blind comprising:
    a plurality of panels having frames and fabric coverings spanning the frames, the plurality of panels including,
        opposing end panels including a first panel and a second panel,
        a middle panel,
        spacer panels including a third panel and a fourth panel, and
    a plurality of locking hinges including a first pair of locking hinges coupled to and between the middle panel and the third panel, a second pair of locking hinges coupled to and between the middle panel and the fourth panel, a third pair of locking hinges coupled to and between the first panel and the third panel and a fourth pair of locking hinges coupled to and between the second panel and the fourth panel, wherein the first pair of locking hinges are configured for selectively preventing movement of the middle panel relative to the third panel, the second pair of locking hinges are configured for selectively preventing movement of the middle panel relative to the fourth panel, the third pair of locking hinges are configured for selectively preventing movement of the first panel relative to the third panel, and the fourth pair of locking hinges are configured for selectively preventing movement of the second panel relative to the fourth panel, and wherein each locking hinge is disposed between a pair of panel frame protrusions.

2. The hunting blind of claim 1, wherein each of the third panel and the fourth panel includes a rectangular spacer panel frame having an upper horizontal member, a lower horizontal member, a first vertical member extending to and between a first end of the upper horizontal member and a first end of the lower horizontal member, and a second vertical member extending to and between a second end of the upper horizontal member and a second end of the lower horizontal member, the rectangular spacer panel frame excluding telescoping legs and support members configured for extending to and between the rectangular spacer panel frame and a surface on which the hunting blind is supported.

3. The hunting blind of claim 1, wherein the fabric coverings each include a mesh upper section through which a user can see and an opaque section therebelow having an exterior surface arranged to face an animal being hunted, the exterior surface including a camouflage pattern.

4. The hunting blind of claim 1, wherein the hunting blind is configured to be positioned in a raised configuration with a pair of telescoping legs of the middle panel and a pair of telescoping legs of each of the end panels extended.

5. The hunting blind of claim 1, wherein the hunting blind is configured to be positioned in a lowered configuration with a pair of telescoping legs of the middle panel and a pair of telescoping legs of each of the end panels retracted.

6. The hunting blind of claim 1, wherein the middle panel and the spacer panels are configured to extend along a common plane.

7. The hunting blind of claim 6, wherein the common plane forms an angle in a range of about 75 degrees to about 90 degrees with a surface upon with the hunting blind is supported.

8. The hunting blind of claim 1, wherein each panel of the plurality of panels is configured to form an angle of about 90 degrees with a surface upon with the hunting blind is supported.

9. A hunting blind comprising:
a plurality of panels having frames and fabric coverings spanning the frames, the plurality of panels including,
opposing end panels including a first panel and a second panel,
a middle panel,
spacer panels including a third panel and a fourth panel, and
a plurality of locking hinges including a first pair of locking hinges coupled to and between the middle panel and the third panel, a second pair of locking hinges coupled to and between the middle panel and the fourth panel, a third pair of locking hinges coupled to and between the first panel and the third panel and a fourth pair of locking hinges coupled to and between the second panel and the fourth panel,
wherein the first pair of locking hinges are configured for selectively preventing movement of the middle panel relative to the third panel, the second pair of locking hinges are configured for selectively preventing movement of the middle panel relative to the fourth panel, the third pair of locking hinges are configured for selectively preventing movement of the first panel relative to the third panel, and the fourth pair of locking hinges are configured for selectively preventing movement of the second panel relative to the fourth panel, and wherein each of the first panel and the second panel includes an end panel frame having an upper horizontal member, a lower horizontal member having a length that is greater than a length of the upper horizontal member, a first vertical member extending to and between a first end of the upper horizontal member and a first end of the lower horizontal member, a second vertical member extending to and between a second end of the upper horizontal member and a second end of the lower horizontal member, a telescoping first leg arranged to selectively extend downward from the first vertical member and a telescoping second leg arranged to selectively extend downward from the second vertical member.

10. A hunting blind comprising:
a plurality of panels having frames and fabric coverings spanning the frames, the plurality of panels including,
opposing end panels including a first panel and a second panel,
a middle panel,
spacer panels including a third panel and a fourth panel, and
a plurality of locking hinges including a first pair of locking hinges coupled to and between the middle panel and the third panel, a second pair of locking hinges coupled to and between the middle panel and the fourth panel, a third pair of locking hinges coupled to and between the first panel and the third panel and a fourth pair of locking hinges coupled to and between the second panel and the fourth panel,
wherein the first pair of locking hinges are configured for selectively preventing movement of the middle panel relative to the third panel, the second pair of locking hinges are configured for selectively preventing movement of the middle panel relative to the fourth panel, the third pair of locking hinges are configured for selectively preventing movement of the first panel relative to the third panel, and the fourth pair of locking hinges are configured for selectively preventing movement of the second panel relative to the fourth panel, and
wherein the middle panel includes a rectangular middle panel frame defining a plane and having an upper horizontal member, a lower horizontal member, a first vertical member extending to and between a first end of the upper horizontal member and a first end of the lower horizontal member, a second vertical member extending to and between a second end of the upper horizontal member and a second end of the lower horizontal member, a pair of telescoping legs configured for selectively extending downwardly therefrom along the plane for supporting the blind on a surface, the middle panel frame excluding a support member configured for extending from the middle panel at an angle to the plane and to a surface on which the blind is supported.

11. A hunting blind comprising:
a plurality of panels having frames and fabric coverings spanning the frames, the plurality of panels including,
opposing end panels including a first panel and a second panel,
a middle panel,
spacer panels including a third panel and a fourth panel, and
a plurality of locking hinges including a first pair of locking hinges coupled to and between the middle panel and the third panel, a second pair of locking hinges coupled to and between the middle panel and the fourth panel, a third pair of locking hinges coupled to and between the first panel and the third panel and a fourth pair of locking hinges coupled to and between the second panel and the fourth panel,
wherein the first pair of locking hinges are configured for selectively preventing movement of the middle panel relative to the third panel, the second pair of locking hinges are configured for selectively preventing movement of the middle panel relative to the fourth panel, the third pair of locking hinges are configured for selectively preventing movement of the first panel relative to the third panel, and the fourth pair of locking hinges are configured for selectively preventing movement of the second panel relative to the fourth panel, and
wherein each locking hinge of the plurality of locking hinges includes a pair of panel frame member receiving pathways defined by a pair of opposing plates, a bushing disposed in each of the frame member receiving pathways, and a cam lock bolt operatively coupled to the pair of opposing plates and configured for selectively compressing each of the bushings between the pair of opposing plates, wherein each bushing includes a split in a sidewall thereof.

12. A hunting blind comprising:
a plurality of panels having frames and fabric coverings spanning the frames, the plurality of panels including,
opposing end panels including a first panel and a second panel,
a middle panel,
spacer panels including a third panel and a fourth panel, and
a plurality of locking hinges including a first pair of locking hinges coupled to and between the middle panel and the third panel, a second pair of locking hinges coupled to and between the middle panel and the fourth panel, a third pair of locking hinges coupled to and between the first panel and the third panel and a fourth pair of locking hinges coupled to and between the second panel and the fourth panel,
wherein the first pair of locking hinges are configured for selectively preventing movement of the middle panel relative to the third panel, the second pair of locking hinges are configured for selectively preventing movement of the middle panel relative to the fourth panel, the third pair of locking hinges are configured for selectively preventing movement of the first panel relative to the third panel, and the fourth pair of locking hinges are configured for selectively preventing movement of the second panel relative to the fourth panel,
wherein the fabric coverings each include a mesh upper section through which a user can see and an opaque section therebelow having an exterior surface arranged to face an animal being hunted, the exterior surface including a camouflage pattern, and
wherein the opaque section includes a sleeve portion formed at each opposing lateral edge thereof for coupling the fabric covering to the frame.

13. The hunting blind of claim 12, wherein the opaque section includes at least one connector configured for detachably coupling the fabric covering to an adjacent fabric covering.

14. A hunting blind comprising:
a plurality of panels having frames and fabric coverings spanning the frames, the plurality of panels including,
opposing end panels including a first panel and a second panel,
a middle panel,
spacer panels including a third panel and a fourth panel, and
a plurality of locking hinges including a first pair of locking hinges coupled to and between the middle panel and the third panel, a second pair of locking hinges coupled to and between the middle panel and the fourth panel, a third pair of locking hinges coupled to and between the first panel and the third panel and a fourth pair of locking hinges coupled to and between the second panel and the fourth panel,
wherein the first pair of locking hinges are configured for selectively preventing movement of the middle panel relative to the third panel, the second pair of locking hinges are configured for selectively preventing movement of the middle panel relative to the fourth panel, the third pair of locking hinges are configured for selectively preventing movement of the first panel relative to the third panel, and the fourth pair of locking hinges are configured for selectively preventing movement of the second panel relative to the fourth panel,
wherein the hunting blind is configured to be positioned in a raised configuration with a pair of telescoping legs of the middle panel and a pair of telescoping legs of each of the end panels extended, and
wherein, when in the raised configuration, a lower section of the fabric covering is in an unrolled or unfolded configuration.

15. A hunting blind comprising:
a plurality of panels having frames and fabric coverings spanning the frames, the plurality of panels including,
opposing end panels including a first panel and a second panel,
a middle panel,
spacer panels including a third panel and a fourth panel, and
a plurality of locking hinges including a first pair of locking hinges coupled to and between the middle panel and the third panel, a second pair of locking hinges coupled to and between the middle panel and the fourth panel, a third pair of locking hinges coupled to and between the first panel and the third panel and a fourth pair of locking hinges coupled to and between the second panel and the fourth panel,
wherein the first pair of locking hinges are configured for selectively preventing movement of the middle panel relative to the third panel, the second pair of locking hinges are configured for selectively preventing movement of the middle panel relative to the fourth panel, the third pair of locking hinges are configured for selectively preventing movement of the first panel relative to the third panel, and the fourth pair of locking hinges are configured for selectively preventing movement of the second panel relative to the fourth panel, and wherein the hunting blind is configured to be positioned in a lowered configuration with a pair of telescoping legs of the middle panel and a pair of telescoping legs of each of the end panels retracted, and when in the lowered configuration, a lower section of the fabric covering is rolled or folded upward and secured in a rolled or folded upward configuration.

16. A hunting blind comprising:

a plurality of panels including, opposing end panels including a first and second panel, each of the first panel and the second panel including an end panel frame having an upper end panel horizontal member, a lower end panel horizontal member having a lower end panel length that is greater than an upper end panel length of the upper end panel horizontal member, a first end panel vertical member extending to and between a first end of the upper end panel horizontal member and a first end of the lower end panel horizontal member, a second end panel vertical member extending to and between a second end of the upper end panel horizontal member and a second end of the lower end panel horizontal member, a telescoping end panel first leg arranged to selectively extend downward from the first end panel vertical member and a telescoping end panel second leg arranged to selectively extend downward from the second end panel vertical member, a middle panel including a rectangular middle panel frame defining a plane and having an upper middle panel horizontal member, a lower middle panel horizontal member, a first middle panel vertical member extending to and between a first end of the upper middle panel horizontal member and a first end of the lower middle panel horizontal member, a second middle panel vertical member extending to and between a second end of the upper middle panel horizontal member and a second end of the lower middle panel horizontal member, a pair of telescoping middle panel legs configured for selectively extending downwardly therefrom along the plane for supporting the hunting blind on a surface, spacer panels including a third and fourth panel, each of the third panel and the fourth panel including a rectangular spacer panel frame having an upper spacer panel horizontal member, a lower spacer panel horizontal member, a first spacer panel vertical member extending to and between a first end of the upper spacer panel horizontal member and a first end of the lower spacer panel horizontal member, and a second spacer panel vertical member extending to and between a second end of the upper spacer panel horizontal member and a second end of the lower spacer panel horizontal member, and a plurality of locking hinges including a first pair of locking hinges coupled to and between the middle panel and the third panel, a second pair of locking hinges coupled to and between the middle panel and the fourth panel, a third pair of locking hinges coupled to and between the first panel and the third panel and a fourth pair of locking hinges coupled to and between the second panel and the fourth panel, wherein the first pair of locking hinges are configured for selectively preventing movement of the middle panel relative to the third panel, the second pair of locking hinges are configured for selectively preventing movement of the middle panel relative to the fourth panel, the third pair of locking hinges are configured for selectively preventing movement of the first panel relative to the third panel, and the fourth pair of locking hinges are configured for selectively preventing movement of the second panel relative to the fourth panel.

17. The hunting blind of claim 16, wherein each locking hinge of the plurality of locking hinges includes a pair of panel frame member receiving pathways defined by a pair of opposing plates, a bushing disposed in each of the frame member receiving pathways, and a cam lock bolt operatively coupled to the pair of opposing plates and configured for selectively compressing each of the bushings between the pair of opposing plates, wherein each bushing includes a split in a sidewall thereof.

18. The hunting blind of claim 16, wherein each panel of the plurality of panels includes a fabric covering with a mesh upper section through which a user can see and an opaque section therebelow having an exterior surface arranged to face an animal being hunted, the exterior surface including a camouflage pattern.

19. The hunting blind of claim 16, wherein the hunting blind is configured to be positioned in a raised configuration with the telescoping end panel first legs, telescoping end panel second legs, and telescoping middle panel legs extended.

20. The hunting blind of claim 19 wherein, when in the raised configuration, a lower section of a fabric covering is in an unrolled or unfolded configuration.

21. The hunting blind of claim 16, wherein the hunting blind is configured to be positioned in a lowered configuration with the telescoping end panel first legs, telescoping end panel second legs, and telescoping middle panel legs retracted.

22. The hunting blind of claim 21 wherein, when in the lowered configuration, a lower section of a fabric covering is rolled or folded upward and secured in a rolled or folded upward configuration.

23. The hunting blind of claim 16, wherein the second end panel vertical member of the first panel is arranged adjacent to and essentially parallel to the first spacer panel vertical member of the third panel and the first end panel vertical member of the second panel is arranged adjacent to and essentially parallel to the second spacer panel vertical member of the fourth panel.

24. The hunting blind of claim 23, wherein each of the first end panel vertical member of the first panel and the second end panel vertical member of the second panel is configured to extend at an angle of about 45 degrees from the surface upon which the hunting blind is supported.

* * * * *